(12) United States Patent
Oyama

(10) Patent No.: US 8,886,254 B2
(45) Date of Patent: Nov. 11, 2014

(54) RADIO BASE STATION AND ANTENNA WEIGHT SETTING METHOD

(75) Inventor: Teppei Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 13/352,522

(22) Filed: Jan. 18, 2012

(65) Prior Publication Data

US 2012/0190396 A1 Jul. 26, 2012

(30) Foreign Application Priority Data

Jan. 21, 2011 (JP) ................................. 2011-011216

(51) Int. Cl.
*H04M 1/00* (2006.01)
*H04W 16/28* (2009.01)

(52) U.S. Cl.
CPC .................................... *H04W 16/28* (2013.01)
USPC .................... 455/562.1; 455/67.11; 455/63.4; 370/252; 370/334

(58) Field of Classification Search
CPC ..................... H04L 5/005; H04L 2025/03426; H04L 25/0226; H04L 25/03343; H04B 7/024; H04B 7/0617; H04B 7/0408; H04B 7/0634; H04B 7/0695; H04B 7/0848; H04B 7/086; H04B 7/0897; H04B 7/0842; H04W 16/28; H04W 72/046; H01Q 3/2605
USPC ............... 455/101, 69, 562.1, 522, 63.4, 504, 455/66.1, 67.11, 132, 323, 334, 456.5, 455/456.6, 560, 561, 517; 370/203, 370/328–335, 280, 252; 375/299, 346, 347, 375/267, 316, 147, 148
See application file for complete search history.

(56) References Cited

U.S. PATENT DOCUMENTS

| | | | |
|---|---|---|---|
| 6,879,624 B2 * | 4/2005 | Sano | 375/147 |
| 7,453,854 B2 * | 11/2008 | Fujishima et al. | 370/335 |
| 7,613,563 B2 * | 11/2009 | Haegebarth et al. | 701/117 |
| 2002/0080068 A1 | 6/2002 | Kim et al. | |
| 2005/0037718 A1 * | 2/2005 | Kim et al. | 455/101 |
| 2005/0250542 A1 | 11/2005 | Aoyama et al. | |
| 2008/0232494 A1 * | 9/2008 | Pan et al. | 375/260 |
| 2010/0246527 A1 * | 9/2010 | Montojo et al. | 370/330 |
| 2010/0255790 A1 * | 10/2010 | Farajidana et al. | 455/69 |
| 2013/0064147 A1 * | 3/2013 | Takamatsu | 370/280 |
| 2013/0303217 A1 * | 11/2013 | Tao | 455/501 |

FOREIGN PATENT DOCUMENTS

| | | |
|---|---|---|
| JP | 4-320122 | 11/1992 |
| JP | 2001-197551 | 7/2001 |
| JP | 2002-232225 | 8/2002 |

(Continued)

OTHER PUBLICATIONS

Notification of Reasons for Refusal dated Jan. 14, 2014 from corresponding Japanese Application No. 2011-011216.

*Primary Examiner* — Sujatha Sharma
(74) *Attorney, Agent, or Firm* — Katten Muchin Rosenman LLP

(57) ABSTRACT

A radio base station which includes an antenna and adjusts directivity of a radio wave to be transmitted and received by antenna weight of the antenna, the radio base station includes a receiver which receives a first reference signal from a first mobile terminal and a second reference signal from a second mobile terminal and a processer which produces antenna weight which is based on the first and the second reference signals, to the antenna for sending a common data to the first and the second mobile terminals.

11 Claims, 16 Drawing Sheets

(56) References Cited

FOREIGN PATENT DOCUMENTS

| | | |
|---|---|---|
| JP | 2003-258534 | 9/2003 |
| JP | 2004-104206 | 4/2004 |
| JP | 2006-60682 | 3/2006 |
| JP | 2009-290494 | 12/2009 |
| WO | 2005/013632 | 2/2005 |

* cited by examiner

RADIO BASE STATION AND ANTENNA WEIGHT SETTING METHOD

CROSS-REFERENCE TO RELATED APPLICATIONS

This application is based upon and claims the benefit of priority from the prior Japanese Patent Application No. 2011-011216 filed on Jan. 21, 2011, the entire contents of which are incorporated herein by reference.

FIELD

The embodiments discussed herein are related to a technique for adjusting a radio wave transmitted and received in a vertical plane and/or a horizontal plane in a mobile communication system.

BACKGROUND

In a mobile communication system, a telecommunication carrier, which provides services in advance, sets a cell coverage, that is, a service area corresponding to a mobile terminal in each radio base station (hereinafter referred to as "base station"). The telecommunication carrier sets a radio parameter of a tilt angle of an antenna or the like to the base station to obtain the service area. When the telecommunication carrier sets a prescribed radio parameter and starts an operation of the system, the service area that is scheduled in advance may not be obtained because of a change of an operation condition of the system or of a radio environment (for example, a change of a path loss due to a new building).

To maintain the quality of the communication service provided to a user of the system, the telecommunication carrier measures the service area of the base station by measuring a reception power in a mobile terminal of the radio signal from the base station by a wave measuring device or the like. The service area as the measurement result is compared with the service area that is scheduled to be a target in advance, and the change of the radio parameter is performed regularly or irregularly if desired. The above-described change of the radio parameter is performed according to the change of the radio environment such as a traffic change or the like, so that a high cost for security is desired. According to the mobile communication system, there is a known tilt angle determining method for dynamically adjusting the tilt angle of the antenna of the base station (International Publication Pamphlet No. WO2005/013632 or the like). The known tilt angle determining method includes an operation for setting an initial value of the tilt angle, an operation for calculating a deterioration rate of the system (the service area or the like) in which the tilt angle has the initial value, an operation for selecting an antenna that decreases the tilt angle, an operation for decreasing the tilt angle of the selected antenna, an operation for calculating the deterioration rate obtained when the tilt angle is decreased, and an operation for repeating continuation determination of the processing for decreasing or increasing the sequence of tilt angles. The known tilt angle determining method further includes an operation for outputting the tilt angle of which the deterioration rate is decreased and an operation for determining the end of the repeating processing of the above-described operations.

According to the above-described conventional method for dynamically adjusting the tilt angle of the antenna, a device that determines the tilt angles of the antennas of a plurality of base stations is provided. The device observes the quality change inside the area to retrieve an optimum tilt angle while changing the tilt angle of each of the base stations to retrieve the optimum tilt angle. That is, the processing for calculating the deterioration rate of the system every time the tilt angle is slightly changed and for repeating the change of the tilt angle until the deterioration rate is acceptable. As a result, retrieving the optimum value of the tilt angle takes time, so that the reception quality inside the area may frequently change during the retrieval of the optimum value.

SUMMARY

According to an aspect of the invention, a radio base station which includes an antenna and adjusts directivity of a radio wave to be transmitted and received by antenna weight of the antenna, the radio base station includes a receiver which receives a first reference signal from a first mobile terminal and a second reference signal from a second mobile terminal and a processer which produces antenna weight which is based on the first and the second reference signals, to the antenna for sending a common data to the first and the second mobile terminals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION OF THE PREFERRED EMBODIMENTS

One aspect of the embodiment is to provide a radio base station and an antenna weight setting method, which may adjust, in a shorter time and a desired direction, a directivity in a vertical plane and/or a horizontal plane of a radio wave transmitted and received by an antenna. A plurality of embodiments will be described below. Hereinafter, a cell or a service area of a base station is referred to as an "area." A geological area that includes areas of a plurality of base stations managed by a control station is referred to as a "management area" if desired.

(1) First Embodiment (1-1) Mobile Communication System

Figure 1:
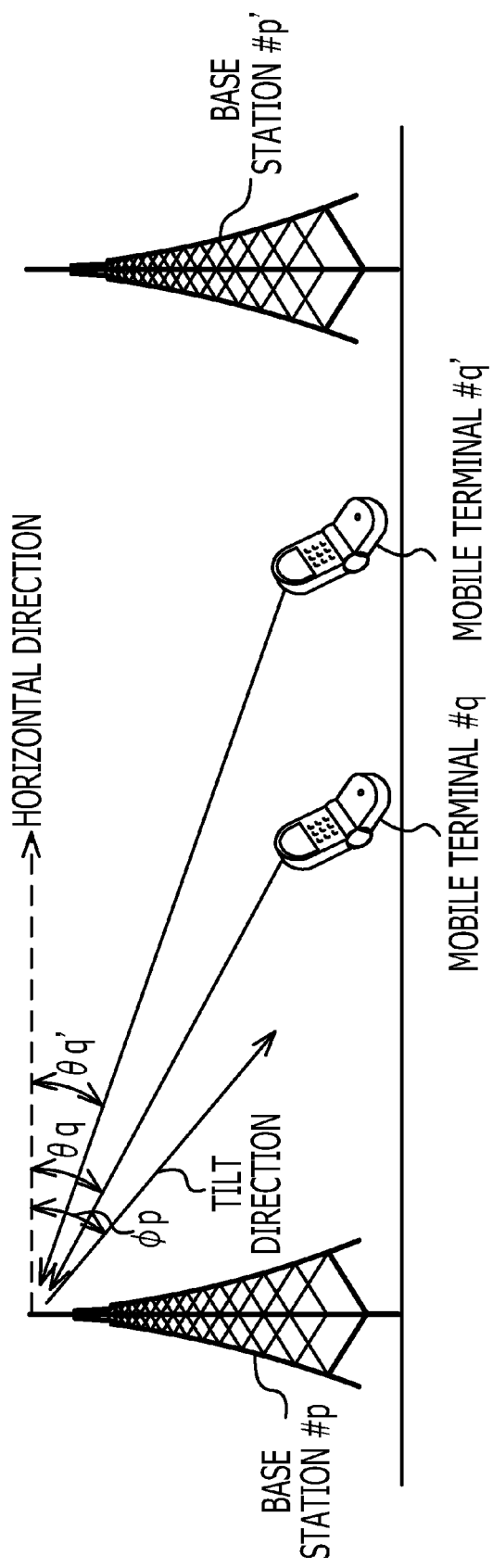
FIG. 1 is a diagram illustrating an overview of a mobile communication system according to a first embodiment.
Figure 2:
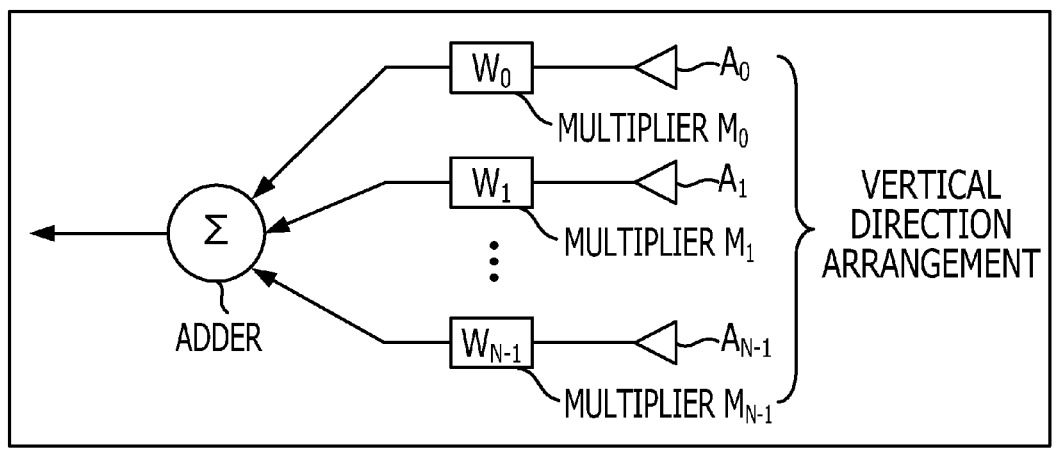
FIG. 2 is a diagram conceptually illustrating an antenna system in a base station according to the first embodiment.

As illustrated in FIG. 1, in a mobile communication system according to a first embodiment, there is a plurality of radio base stations (hereinafter referred to as "base station") in a prescribed area. For example, FIG. 1 illustrates two base stations arranged to be adjacent to each other. Hereinafter, a base station as an adjustment target of the directivity in the vertical plane of the radio wave transmitted and received is a base station #p, and a base station (hereinafter, referred to as "adjacent station") that is adjacent to the base station #p is a base station #p'. The base station #p is an example of a first radio base station. The base station #p' is an example of a second radio base station. The base station according to the first embodiment includes an array antenna. The directivity in the vertical plane of the radio wave transmitted and received is adjustable by an antenna weight (complex) that is set to each antenna of the array antenna. By changing the antenna weight that is set to each antenna, the base station that includes the array antenna may electrically change the directivity (for example, the direction of a main lobe of a radio wave emitted from an antenna) in the vertical plane of the radio wave without changing the mechanical arrangement of the antenna. Hereinafter, the directivity in the vertical plane of the radio wave, which is electrically set by the antenna weight, is referred to as "tilt angle" or "tilt direction." As illustrated in FIG. 1, an angle $\phi_p$ is defined as a tilt angle in the tilt direction with respect to the horizontal direction. In FIG. 1, a mobile terminal #q is positioned inside the cell of the base station #p and is coupled with the base station #p. On the other hand, a mobile terminal #q' is positioned inside the cell of the base station #p' as an adjacent station of the base station #p and is coupled with the base station #p'. The mobile terminal #q is an example of the first mobile terminal. The mobile terminal #q' is an example of the second mobile terminal. Hereinafter, the base station coupled with each terminal is referred to as a "coupling station" if desired. In the mobile communication system illustrated in FIG. 1, the base station #p regularly receives a reference signal (for example, a pilot signal) of a known system from the mobile terminal #q' under the base station #p', which is adjacent to the base station #p, in addition to from the mobile terminal #q under the base station #p. By obtaining a transmission timing of the reference signal of the mobile terminal #q' and information for decoding the reference signal from the base station #p', the base station #p may process reception signals from the mobile terminal #q'. For communication between the above-described base stations, an X2 interface may be used in case of Long Term Evolution (LTE), for example. By using θ, FIG. 1 illustrates a signal arriving angle with respect to the horizontal direction or a signal arriving direction of the signal received by the base station #p from the mobile terminal. For example, the signal arriving angle of the reception signal from the mobile terminal #q is indicated as $\theta_q$, and the signal arriving angle of the reception signal from the mobile terminal #q' is indicated as $\theta_{q'}$. FIG. 2 is a diagram conceptually illustrating an antenna system of the base station according to the first embodiment. As illustrated in FIG. 2, in the base station according to the first embodiment, an array antenna having a plurality of antennas $A_0$ to $A_{N-1}$ is arranged in the vertical plane. The antennas are coupled with complex multipliers (or phase shifters) $M_0$ to $M_{N-1}$ to which the antenna weights $w_0$ to $w_{N-1}$ are set, respectively. In the above-described antenna system, an amplitude and/or a phase of the reception signal of each antenna is adjusted by the complex multiplier at the signal reception and is then added by an adder in a later stage. By properly adjusting the antenna weight, the base station with the above-described antenna system may adjust a gain (or an antenna pattern) of the directivity in the vertical plane of the whole array antenna. To transmit (that is, to broadcast) common data to all the mobile terminals under the base station #p, the base station #p sets a common antenna weight for all the mobile terminals. Based on the reference signal transmitted from the mobile terminal to the base station, the base station according to the first embodiment performs the antenna weight setting that is preferable for broadcasting based on the reference signal that is transmitted from the mobile terminal to the base station.

(1-2) Antenna Weight Setting Method

Figure 3:
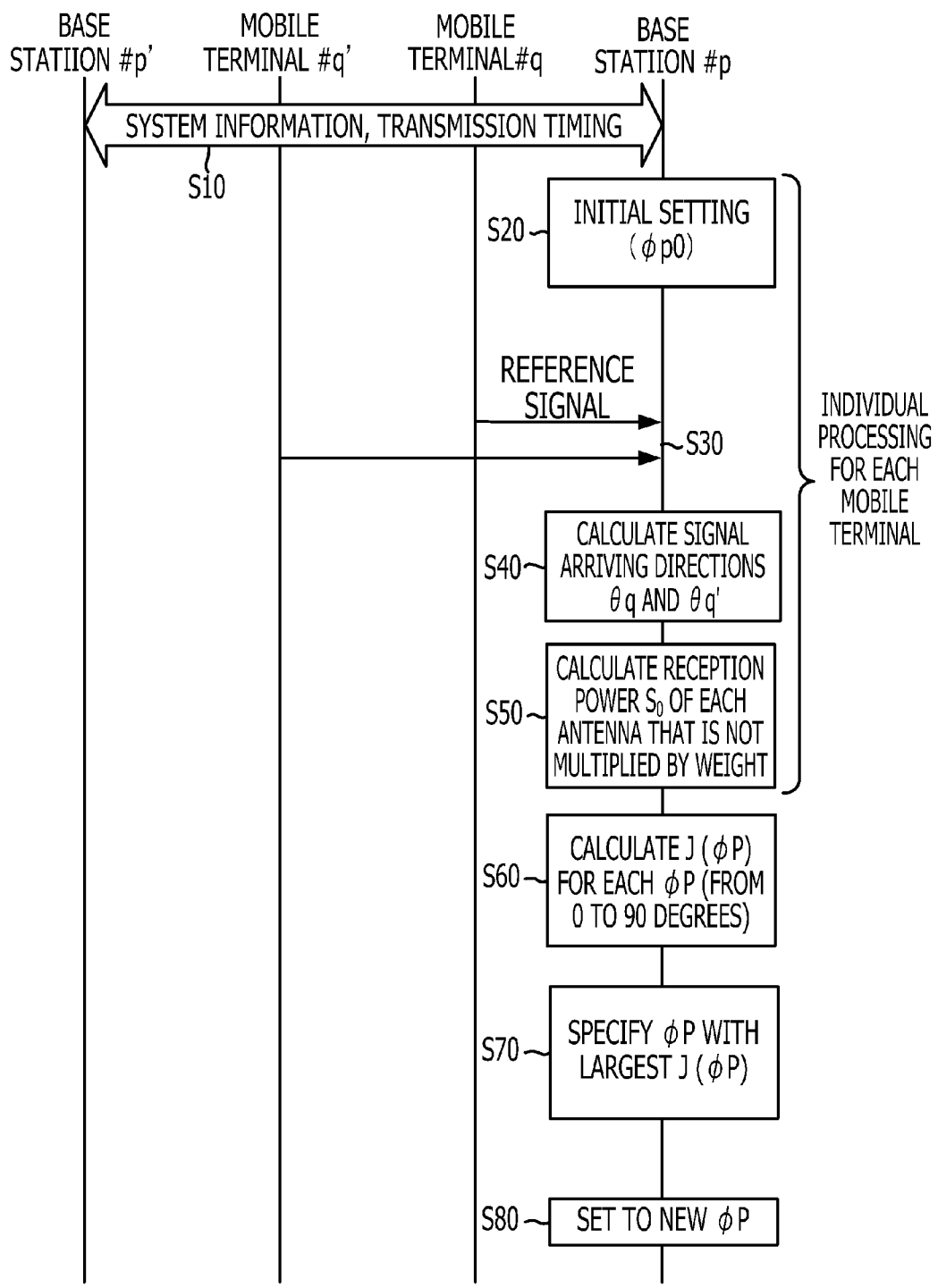
FIG. 3 is a flowchart illustrating an antenna weight setting method that is performed in a base station in the mobile communication system according to the first embodiment.

With reference to FIG. 3, in the mobile communication system according to the first embodiment, an antenna weight setting method performed by the base station will be described below. According to the mobile communication system of the first embodiment, FIG. 3 is a diagram illustrating a flow among the base station #p, an adjacent station #p', the mobile terminal #q coupled with the base station #p, and the mobile terminal #q' coupled with the adjacent station #p' when the base station #p performs the antenna weight setting that is preferable for broadcasting. In FIG. 3, the base station #p obtains the transmission timing of the reference signal of the mobile terminal #q' and the system information for decoding the reference signal from the adjacent station #p' so that the reference signal is properly received from the mobile terminal #q' coupled with the adjacent station #p' (Operation S10). Regarding the base station #p, the tilt angle of the antenna is set to $\phi_{p0}$ at the initial point (Operation S20). The initial set angle $\phi_{p0}$ of the tilt angle is a tilt angle that is not adjusted in the flow illustrated in FIG. 3. The antenna weight determined by the tilt angle $\phi_{p0}$ is an example of a first antenna weight. The base station #p receives a reference signal (for example, a pilot signal) of the known system from the mobile terminals #q' coupled with the adjacent station #p' in addition to from the mobile terminals #q coupled with the base station #p (Operation S30). In Operation S10, since the base station #p already obtains the transmission timing of the reference signal of the mobile terminal #q' and the system information for decoding the reference signal, the base station #p may properly process the reference signal transmitted from the mobile terminal #q'. The base station #p calculates the signal arriving angles $\theta_q$ and $\theta_{q'}$ of the reference signals from the mobile terminals #q and #q' (Operation S40). As described below, if the property of each antenna weight of the array antenna of the base station #p is indicated as a function of the tilt angle, the signal arriving angles $\theta_q$, and $\theta_{q'}$ may be calculated by using the method with the signal arriving angle as the tilt angle with the largest gain of the whole array antenna. The calculation example of the signal arriving angle of the reference signal from the mobile terminal #p performed by the base station #p will be described below. The calculation of the signal arriving angle of the reference signal from the mobile terminal #q' is performed in the similar manner. For example, there is an assumption that an equal-interval linear array as the most basic array antenna is linearly and vertically arranged in the vertical plane and has the interval of the antennas as the equal interval d. In this case, the antennas of the array antenna of the base station #p are omnidirectional in the vertical plane. At this time, there is an assumption that the antenna weight $w_m$ (j is an imaginary unit) of each of the antennas of the number of N, that is, m=0~N−1 if the till angle is $\phi_p$, and $\lambda$ is the wavelength of the radio wave. In this case, a gain G ($\phi_p$, $\theta_q$) (or an antenna pattern) of the whole array antenna is indicated as in the formula (2). The formulas are referred to "Nomoto, Shinichi, Waiyaresu kiso riron, Denshi Joho Tsushin Gakkai (for example, pp. 225-226).

$$w_m = \exp\left(jm\frac{d}{\lambda}\phi_p\right) \quad (1)$$

$$G(\phi_p, \theta_q) \approx \frac{\sin Nd(\theta_q - \phi_p)/\lambda}{\sin d(\theta_q - \phi_p)/\lambda} \quad (2)$$

A Beamformer method is an example of a method for calculating the signal arriving angle of the reference signal from the mobile terminal by using the array antenna. The Beamformer method is referred to "Nomoto, Shinichi, Waiyaresu kiso riron, Denshi Joho Tsushin Gakkai (for example, p. 231). According to the Beamformer method, $\phi_p$ included in the formula (1) is gradually changed (for example, by one degree in the range from 0 to 90 degrees) to calculate G ($\phi_p$, $\theta_q$). Thus, $\phi_p$ with the largest G ($\phi_p$, $\theta_q$) indicates the signal arriving angle $\theta_q$ from the mobile terminal #q. In the similar manner, the signal arriving angle $\theta_{q'}$ from the mobile terminal #q' may be calculated. As illustrated in FIG. 3, if the base station #p calculates the signal arriving angle from the each of the mobile terminals (Operation S40), the reception power $S_0$ of each antenna obtained when the antenna weight is cancelled is calculated for each of the mobile terminals (Operation S50). As described below, the reception power $S_0$ is calculated in advance to obtain the index value of the reception quality inside the area of the base station #p. The reception power $S_0$ is an example of the standard power. The calculation formula of the reception power $S_0$ is indicated as the formula (3). In this case, S ($\phi_{p0}$, $\theta_q$) on the right-hand side of the formula (3) indicates the reception signal (the reception signal from each antenna transmitted from the complex multipliers illustrated in FIG. 2) obtained after the multiplication by the antenna weight is performed. Furthermore, G ($\phi_{p0}$, $\theta_q$) on the left-hand side of the formula (3) may be calculated by plugging the initial set angle $\phi_{p0}$ set in Operation S20 in the formula (1).

$$S_0 = S(\phi_{p0}, \theta_q)/G(\phi_{p0}, \theta_q) \quad (3)$$

If the reception power $S_0$ of each antenna is multiplied by the gain G ($\phi_p$, $\theta_q$) of the antenna weight, the reception power S ($\phi_p$, $\theta_q$) of each antenna, which is obtained when the reference signal from each of the mobile terminals #q is set to the tilt angle $\phi_p$, may be estimated. In this case, the tilt angle $\phi_p$ is variable, and the signal arriving angle $\theta_q$ is calculated in Operation S40. In the similar manner, the reception power S ($\phi_p$, $\theta_{q'}$) of each antenna with respect to the arbitrary tilt angle $\phi_p$ regarding the reference signal from the mobile terminal #q' may be estimated.

$$S(\phi_p,\theta_q) = S_0 \cdot G(\phi_p,\theta_q) = S(\phi_{p0},\theta_q)G(\phi_p,\theta_q)/G(\phi_{p0},\theta_q) \quad (4)$$

The base station #p calculates an index value of the reception quality inside the area of the base station #p if the reference signal from each of the mobile terminals #q obtained by the formula (4) are desired signals and if the reference signal from each of the mobile terminals #q' is an interference signal. For example, the index value is a Signal to Interference-and-Noise Ratio (SINR) of the whole area of the base station #p, and this SINR is assumed to be J ($\phi_p$). At this time, the base station #p uses the above-described formula (4) with respect to each of the mobile terminals to calculate J ($\phi_p$) as in the formula (5) (Operation S60). In the formula (5), $$\sum_{q \in serv}$$

indicates the multiplication regarding all the mobile terminals #q coupled with the base station #p, and $$\sum_{q' \notin serv}$$

indicates the multiplication regarding all the mobile terminals #q' coupled with the adjacent station #p'. Furthermore, N indicates noise and is obtained from the reception signal of the reference signal if the known signal system is cancelled as the reference signal.

$$J(\phi_p) = \frac{\sum_{q \in serv} S(\phi_p, \theta_q)}{N + \sum_{q' \notin serv} S(\phi_p, \theta_{q'})} = \frac{\sum_{q \in serv} S(\phi_{p0}, \theta_q) G(\phi_p, \theta_q)/G(\phi_{p0}, \theta_q)}{N + \sum_{q' \notin serv} S(\phi_{p0}, \theta_{q'}) G(\phi_p, \theta_{q'})/G(\phi_{p0}, \theta_{q'})} \quad (5)$$

In the formula (5), J ($\phi_p$) considers the interference by the mobile terminal #q' in which the base station #p is coupled with the adjacent station #p'. Regarding J ($\phi_p$), the tilt angle $\phi_p$ is variable, and J ($\phi_p$) of the arbitrary tilt angle $\phi_p$ may be calculated. By changing the tilt angle $\phi_p$ by gradually changing the tilt angle $\phi_p$ by a small angle (for example, by one degree) in the range from 0 to 90 degrees to calculate J ($\phi_p$), the base station #p specifies the tilt angle $\phi_p$ with the largest J ($\phi_p$) (Operation S70). Accordingly, the specified tilt angle $\phi_p$ is a tilt angel by which the reception quality of the whole area is excellent. Instead of the initial set angle $\phi_{p0}$ obtained in Operation S20, the base station #p sets the tilt angle of the base station #p to the new tilt angle $\phi_p$ that is specified in Operation S70 (Operation S80). The antenna weight that is determined by the new tilt angle $\phi_p$ specified in Operation S70 is an example of a second antenna weight. It is preferable that the change amount of the new tilt angle $\phi_p$ set in Operation S80 with respect to the initial tilt angle $\phi_{p0}$ that is not adjusted is equal to or lower than the prescribed upper limit. That is, if the tilt angle $\phi_p$ specified in Operation S70 changes to be larger than the initial tilt angle $\phi_{p0}$ by the prescribed upper limit, the tilt angle $\phi_p$ specified in Operation S70 is not set in Operation S80. This may suppress the rapid change of SINR inside the area. As described above, according to the antenna weight setting method of the first embodiment, the base station #p performing broadcasting specifies the tilt angle by which the reception quality inside the area is the most excellent while considering the interference from the mobile terminal coupled with the adjacent station #p'. As illustrated in Operations S30 to S70 in FIG. 3, after receiving the reference signal from each mobile terminal, the base station #p may specify the tilt angle so that the reception quality inside the area is excellent after the calculating processing inside the base station #p is performed. Thus, in the antenna of the base station #p, the directivity in the vertical plane of the radio wave transmitted and received by the antenna of the base station #p is adjustable in a desirable direction in a short time. If the SINR of the whole reception quality of the area that includes the cell of the plurality of base stations is J, J is indicated as in the formula (6). Each of the base stations inside the area may perform optimization of the whole reception quality in the whole area if each of the base stations inside the area optimizes J ($\phi_p$).

$$J = \sum_p J(\phi_p) \quad (6)$$

(1-3) Configuration of Base Station

Figure 4:
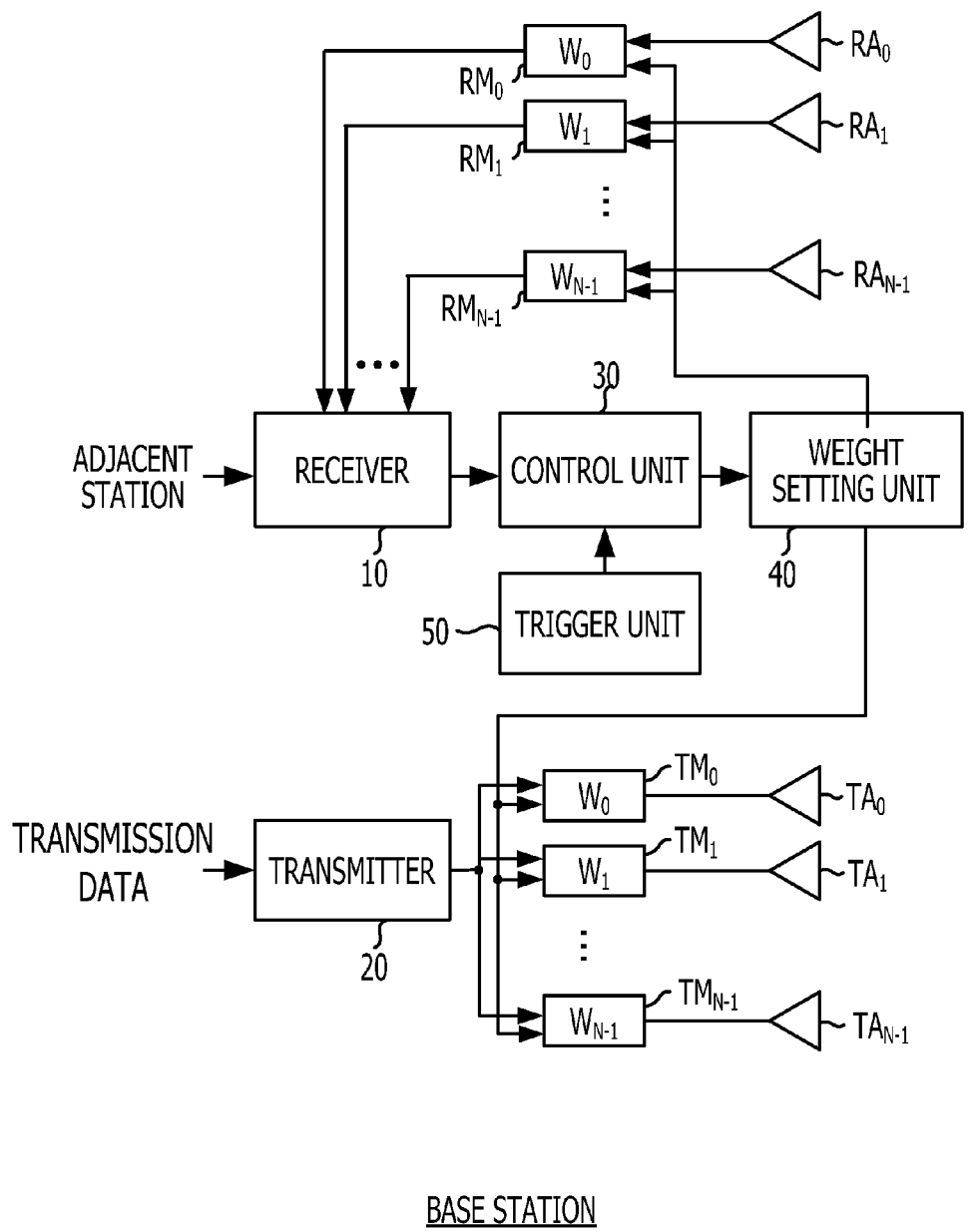
FIG. 4 is a block diagram illustrating a main unit of a configuration of the base station according to the first embodiment.
Figure 5:
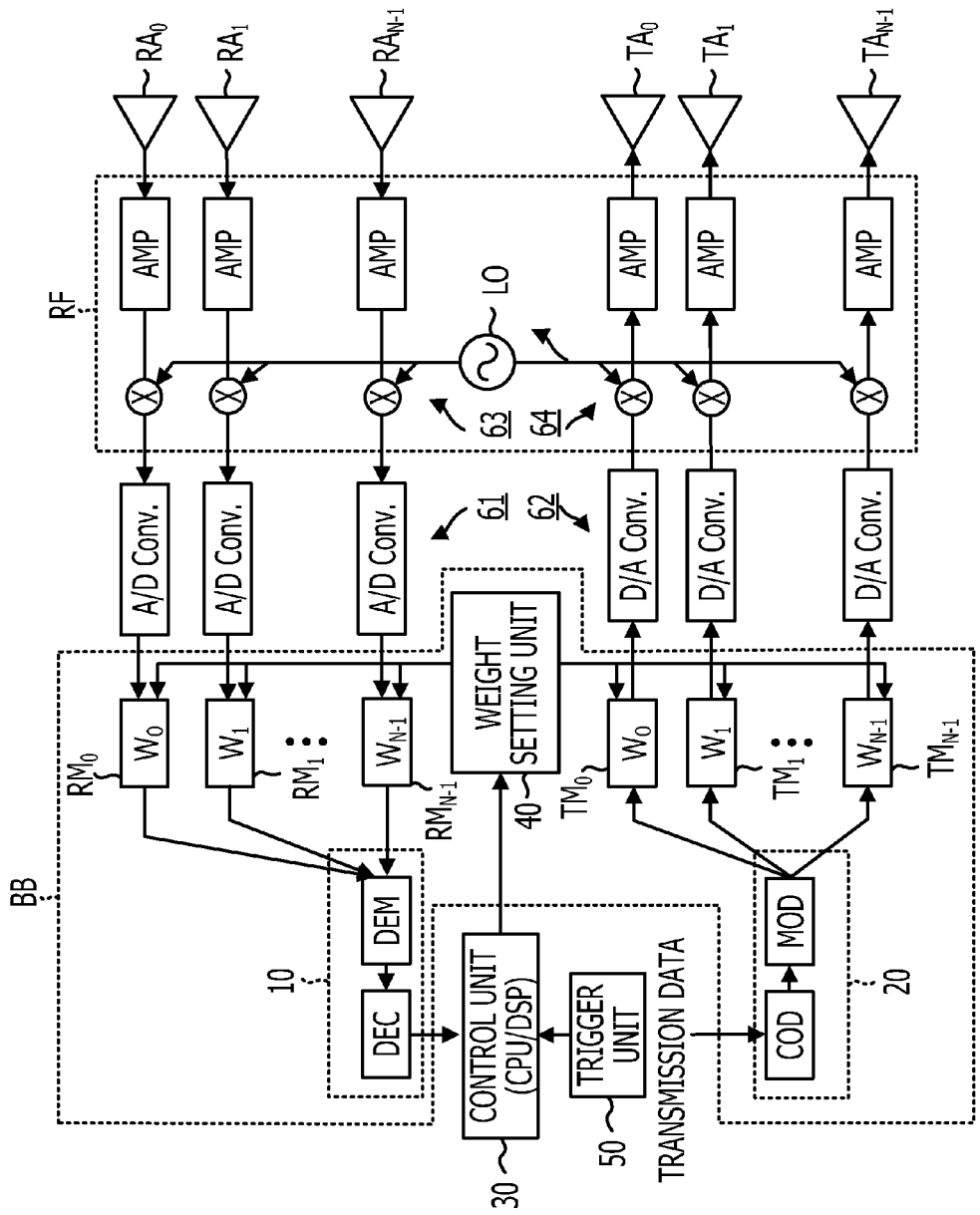
FIG. 5 is a block diagram illustrating details of the configuration of the base station according to the first embodiment.

With reference to FIG. 4, the configuration of the base station that achieves the above-described antenna weight setting method will be described below. FIG. 4 is a block diagram illustrating a main unit of the configuration of the base station. With reference to FIG. 4, the base station according to the first embodiment includes a plurality of reception antennas $RA_0$ to $RA_{N-1}$. A plurality of transmission antennas $TA_0$ to $TA_{N-1}$, a plurality of complex multipliers $RM_0$ to $RM_{N-1}$ for transmission, a receiver 10, a transmitter 20, a control unit 30, a weight setting unit 40, and a trigger unit 50. According to the configuration illustrated in FIG. 4, each of the receiver 10, the transmitter 20, the control unit 30, the weight setting unit 40, and the trigger unit 50 may be mounted on a digital circuit such as a Digital Signal Processor or a processor, for example. The plurality of reception antennas $RA_0$ to $RA_{N-1}$ is arranged in the vertical plane to form the whole reception array antenna. The plurality of transmission antennas $TA_0$ to $TA_{N-1}$ is arranged in the vertical plane to form the whole transmission array antenna. The plurality of reception antennas $RA_0$ to $RA_{N-1}$ is coupled with complex multipliers $RM_0$ to $RM_{N-1}$ of the antenna weights $w_0$ to $w_{N-1}$, respectively. The plurality of transmission antennas $TA_0$ to $TA_{N-1}$ is coupled with the complex multipliers $TM_0$ to $TM_{N-1}$ of the antenna weights $w_0$ to $w_{N-1}$, respectively. The antenna weights $w_0$ to $w_{N-1}$ are set by the weight setting unit 40. The antenna weight corresponding to the plurality of transmission antennas is not typically equivalent to the antenna weight corresponding to the plurality of receiving antennas. The receiver 10 performs receiving processing on signals transmitted from the mobile terminals coupled with the base station and the adjacent station. Specifically, the receiver 10 performs Parallel to Serial (P/S) conversion by combining the reception signals output from the plurality of complex multipliers $RM_0$ to $RM_{N-1}$ for reception. Furthermore, the receiver 10 separates the reception signals obtained from the conversion into the data signal, the control signal, and the reference signal and then performs demodulating processing and decoding processing on each of the signals. The receiver 10 includes, for example, an X2 interface, which is communicable with the adjacent station. The receiver 10 obtains, from the adjacent station through the interface, the transmission timing of the reference signal of the mobile terminal, which is coupled with the adjacent station, and the information for decoding the reference signal. The transmitter 20 performs transmitting processing of the signal corresponding to each of the mobile terminals. More specifically, the transmitter 20 performs coding processing and demodulating processing on the data signal (transmission data), the control signal, and the reference signal and multiplexes the signals. The transmitter 20 performs the S/P conversion on the multiplexed signals and transmits the separated signals to the plurality of complex multipliers $TM_0$ to $TM_{N-1}$ for transmission. The output signals of the plurality of complex multipliers $TM_0$ to $TM_{N-1}$ are given to the corresponding transmission antennas $TA_0$ to $TA_{N-1}$, respectively. The control unit 30 performs initial setting of the tilt angle, calculating of an index value (for example, SINR) of the reception quality inside the area of the base station based on the reference signal from the mobile terminals obtained by the receiver 10, and updating setting of the tilt angle (that is, the processing in Operations S20 and S40 to S80). The specific processing of the updating setting is described above in association with Operations. When the control unit 30 performs the initial setting of the tilt angle or the update setting of the tilt angle, the control unit 30 gives a set value (complex value) of the antenna weight according to the desirable tilt angle to the weight setting unit 40. According to the set value of the antenna weight given by the control unit 30, the weight setting unit 40 performs the setting processing of the antenna weight corresponding to each of the plurality of complex multipliers $RM_0$ to $RM_{N-1}$ for reception and the plurality of complex multipliers $TM_0$ to $TM_{N-1}$ for transmission. The trigger unit 50 is provided so that control unit 30 controls the timing for the update processing of the tilt angle. That is, the control unit 30 synchronizes the timing signal transmitted from the trigger unit 50 and performs Operations S40 to S80. FIG. 5 is a block diagram illustrating details of the configuration of the base station. The block diagram illustrated in FIG. 5 is basically equivalent to FIG. 4. Furthermore, the block diagram illustrated in FIG. 5 describes hardware elements in detail. With reference to FIG. 5, the configuration of the base station will be further described below. FIG. 5 illustrates operations of the reception system. After being amplified by an amplifier (AMP) in a radio processing unit (RF), the radio signals received by the antennas $RA_0$ to $RA_{N-1}$ are mixed with high frequency signals of a Local Oscillator (LO) by mixers of a mixer group 63. As a result, the received radio signals are down-converted into baseband signals. After being amplified by the A/D converters of an A/D converter group 61, the baseband signals are input into complex multipliers $RM_0$ to $RM_{N-1}$ inside a baseband processing unit (BB), respectively. As described above, the reception signal that is output from the plurality of complex multipliers $RM_0$ to $RM_{N-1}$ for reception is combined (added) and subjected to the P/S conversion. The receiver 10 includes a demodulator (DEM) and a decoder (DEC) and performs demodulating processing and decoding processing on the data signal included in the reception signal, the control signal, and the reference signal included in the reception signal. The reception system illustrated in FIG. 5 will be described below. The transmitter 20 includes a coder (COD) and a modulator (MOD), performs the coding processing and the modulating processing on the control signal and the reference signal as well as the transmission data, and multiplexes the control signal and the reference signal. Furthermore, the transmitter 20 performs the S/P conversion on the multiplexed signal, and transmits the separated signals to the plurality of complex multipliers $TM_0$ to $TM_{N-1}$ for transmission. After being converted into analog signals by the D/A converters of the D/A converter group 62, the output signals of the plurality of complex multipliers $TM_0$ to $TM_{N-1}$ are transmitted to the RF. The analog signals of each D/A converter are mixed with high frequency signals of a Local Oscillator (LO) by mixers of a mixer group 64. Accordingly, the baseband signals are up-converted into radio signals. After being amplified by the AMP, the radio signals are emitted into space from each of the plurality of transmission antennas $TA_0$ to $TA_{N-1}$.

(1-4) Adjustment of Directivity in Horizontal Plane

Figure 6:
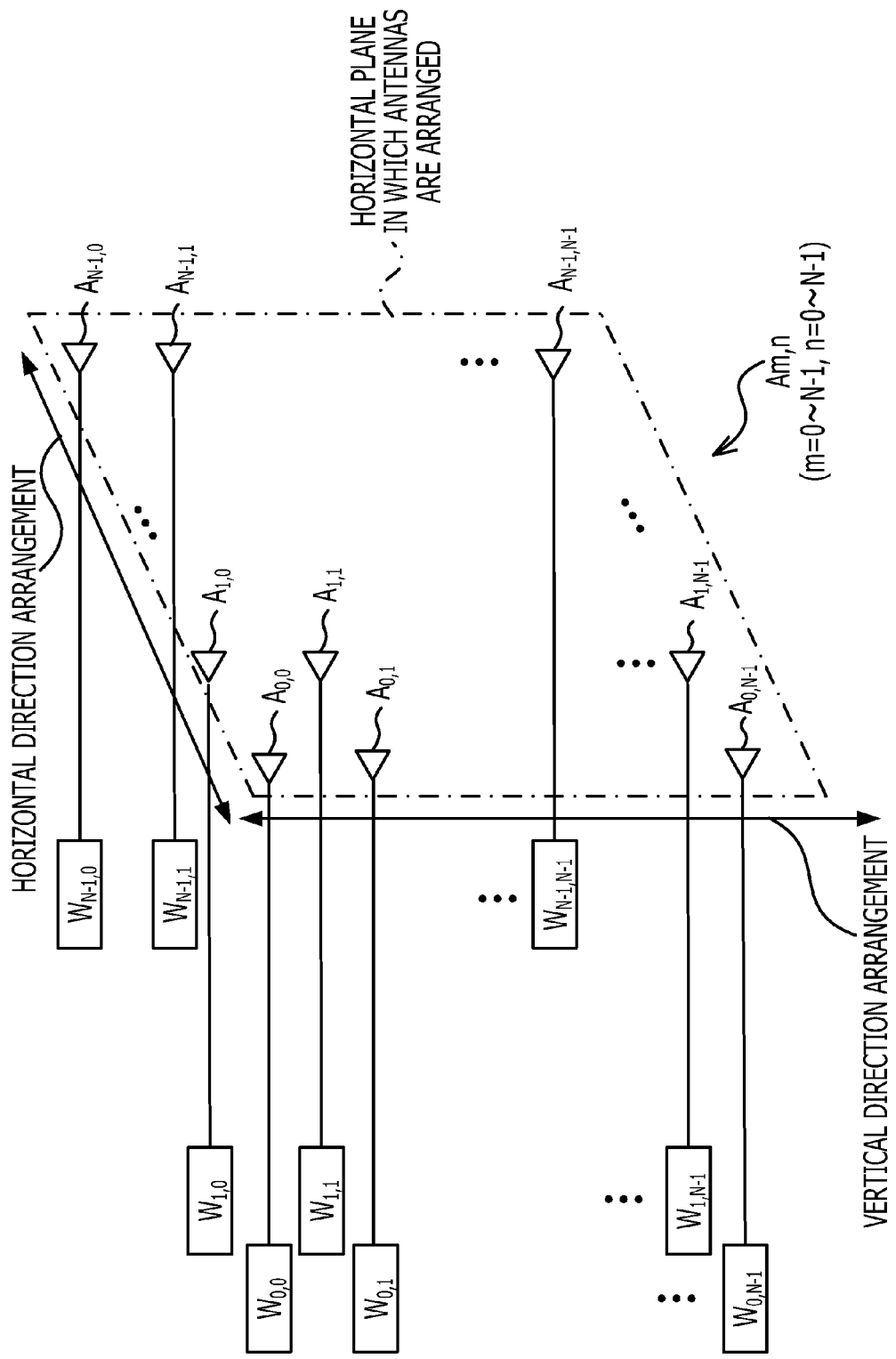
FIG. 6 is a diagram illustrating a physical arrangement of array antennas of a plane array configured to be a square and a antenna weight setting that is conceptual and set corresponding to each antenna.
Figure 7:
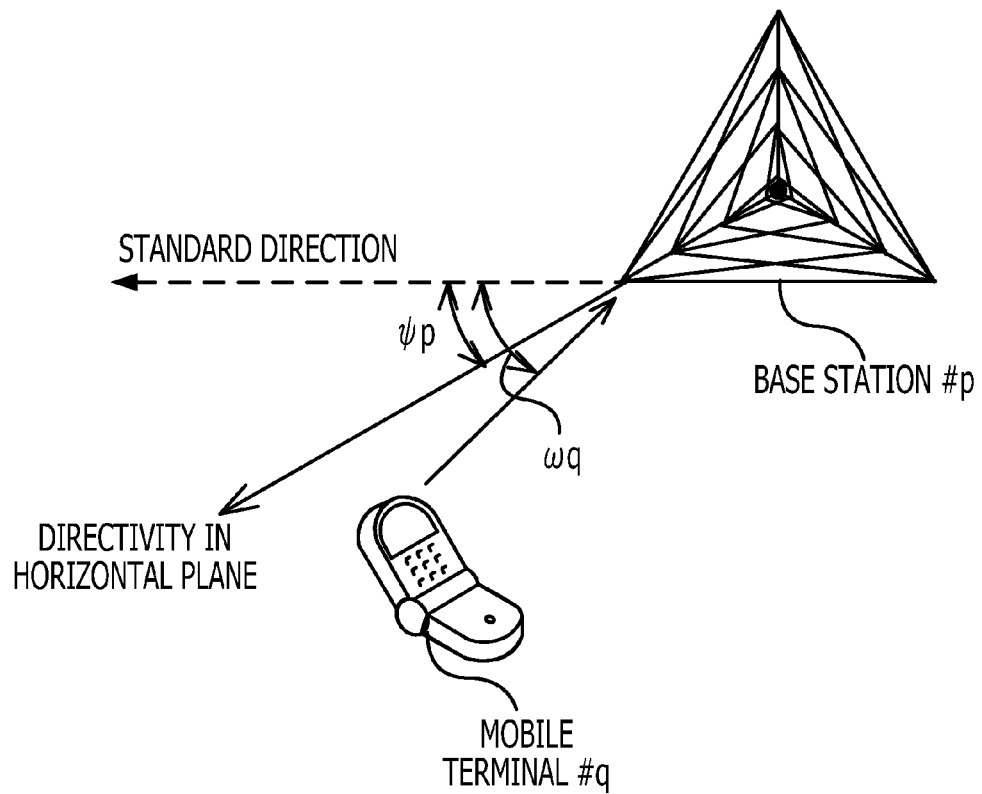
FIG. 7 is a diagram illustrating a directivity in a horizontal plane, which is obtained when the base station is viewed from a planner view, and a signal arriving direction from the mobile terminal according to the first embodiment.

In the above description, the tilt angle of the antenna of the base station, that is, the directivity of the antenna in the vertical plane is an adjustment target. The directivity of the antenna in the horizontal plane is also applicable. The antenna weight setting method for adjusting the directivity in the vertical plane and the horizontal plane will be described below. FIG. 6 is a diagram illustrating a physical arrangement of the array antenna of the plane array, which is configured to be a square with the antennas of the number of N in the vertical direction and of the number of N in the horizontal direction, and a conceptual antenna weight setting that is set to each of the antennas. As illustrated in FIG. 6, antenna weights $w_{m,n}$ is set to antennas $A_{m,n}$ (m=0 to N−1, n=N−1), respectively. At this time, each of the antennas is omnidirectional in the vertical plane and the horizontal plane, and the space between the antennas is an equal distance d in the vertical plane and the horizontal plane. On the other hand, FIG. 7 is a diagram illustrating the directivity in the horizontal plane of the base station #p viewed from the planner and the signal arriving direction from the mobile terminal. In FIG. 7, the directivity in the horizontal plane with a prescribed standard direction as a standard is defined as $\psi_p$, and the signal arriving angle from the mobile terminal with the similar standard direction as a standard is defined as $\omega_q$. At this time, the antenna weight setting of the formula (1) described above is extended to be in the horizontal plane as indicated in the formula (7). In this case, the gain G ($\phi_p$, $\theta_q$, $\psi_p$, $\omega_q$) of the whole array antenna (or the antenna pattern) may be indicated as multiplication of the gain in the vertical plane (see, for example, the formula (2)) and the gain in the horizontal plane as illustrated in the formula (8).

$$w_{m,n} = \exp\left(jm\frac{d}{\lambda}\phi_p + jn\frac{d}{\lambda}\psi_p\right) \quad (7)$$

$$G(\phi_p, \theta_q, \psi_p, \omega_q) \approx G(\phi_p, \theta_q)G(\psi_p, \omega_q) = \quad (8)$$
$$\frac{\sin Nd(\theta_q - \phi_p)/\lambda}{\sin d(\theta_q - \phi_p)/\lambda} \times \frac{\sin Nd(\omega_q - \psi_p)/\lambda}{\sin d(\omega_q - \psi_p)/\lambda}$$

The method for calculating the signal arriving angle of the reference signal from the mobile terminal may be equivalent to the case of the arrangement in the vertical direction. For example, $\psi_q$ is gradually (for example, by one degree in the range from 0 to 90 degrees) changed to calculate G ($\psi_p$, $\omega_q$), and $\psi_q$ with the largest value G ($\psi_p$, $\omega_q$) is the signal arriving angle $\omega_q$ from the mobile terminal #q. Alternatively, the signal arriving angles in the vertical direction and the horizontal direction may be simultaneously calculated. That is, the combination of ($\phi_p$, $\psi_q$) is gradually changed (for example, by one degree in the range from 0 to 90 degrees) to calculate G ($\phi_p$, $\theta_q$, $\psi_p$, $\omega_q$). The combination of ($\phi_p$, $\psi_q$) where G($\phi_p$, $\theta_q$, $\psi_p$, $\omega_q$) has the largest value is the signal arriving angle ($\theta_q$, $\omega_q$) from the mobile terminal #q. In the similar way, the signal arriving angle ($\theta_{q'}$, $\omega_{q'}$) from the mobile terminal #q' may be calculated. The method for the index value (for example, SINR) calculating of the reception quality in the service area of the base station #p, which is obtained when the reference signal from each of the mobile terminals #q is a desired signal and when the reference signal from each of the mobile terminals #q' is an interference signal, is similar to the case of the antenna arrange simply in the vertical direction. At this time, since J as the SINR is indicated as two variable numbers $\phi_p$, and $\psi_p$, the base station #p gradually changes (for example, by one degree in the range from 0 to 90 degrees) the combination ($\phi_p$, $\psi_p$) to retrieve the combination ($\phi_p$, $\psi_p$) with the largest J ($\phi_p$, $\psi_p$).

(2) Second Embodiment

Figure 8:
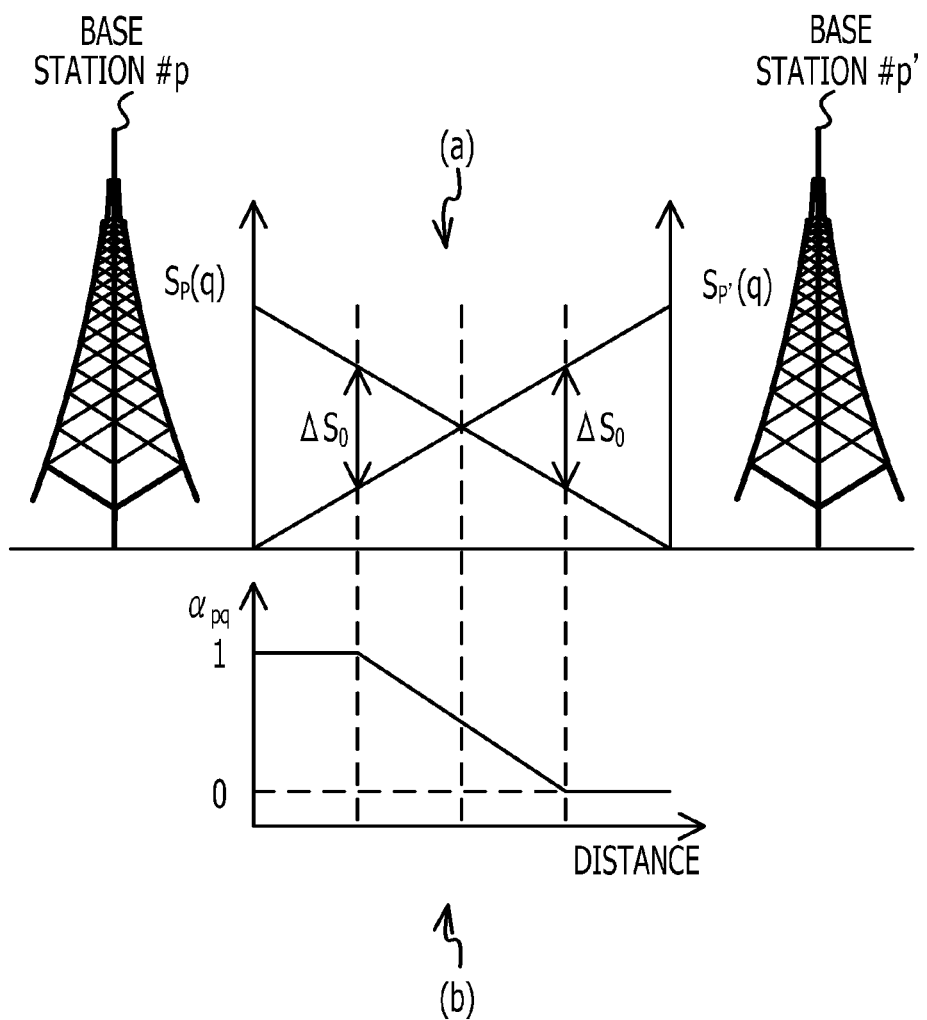
FIG. 8 is a diagram illustrating an estimating method of a reception power of a reference signal according to a second embodiment.

A second embodiment will be described. The following embodiments describe that the tilt angle of the antenna of the base station, that is, the directivity of the antenna in the vertical plane is the adjustment target. However, as described above, the adjustment target may be extended to the directivity of the antenna in the horizontal plane. In the first embodiment, based on the reception power of the uplink reference signal received by the base station from the mobile terminal, the method for setting the antenna weight for the broadcasting from the base station is described. On the other hand, the second embodiment is different from the first embodiment in that the antenna weight of broadcasting from the base station is set based on the reception power in the mobile terminal of the downlink reference signal reported to the base station from the mobile terminal. Even if the antenna weight is set based on the reception power in the mobile terminal of the downlink reference signal, J ($\phi_p$) may be calculated in the manner equivalent to the manner described in the first embodiment. In this case, by calculating the reception power $S_0$ in the mobile terminal before the multiplication by the antenna weight and multiplying the reception power $S_0$ by the gain G ($\phi_p$, $\theta_q$) of the antenna weight, the reception power S ($\phi_p$, $\theta_q$) of the reference signal in each of the mobile terminals may be estimated when the arbitrary tilt angle $\phi_p$ is set. However, some of the base stations #p may not obtain the reception power of the reference signal in the mobile terminal #q' coupled with the adjacent station #p'. According to the second embodiment, based on the reported value of the reception power of the downlink reference signal in the mobile terminal coupled with the base station, the base station sets the antenna weight of the base station so that the reception quality in consideration of interference from the adjacent station is excellent. The configuration of the base station according to the second embodiment may be equivalent to FIG. 4. In the base station according to the second embodiment, by multiplying the reception power of the reference signal in the mobile terminal coupled with the base station by a coefficient, the control unit 30 functions as an estimating unit that estimates the reception power of the reference signal in the mobile terminal coupled to the adjacent station. In the antenna setting method according to the second embodiment, under the condition that there is a high possibility that the mobile terminal is coupled to the adjacent station as the mobile terminal is far away from the base station, the base station that adjusts the directivity of the antenna in the vertical plane calculates $\alpha_{pq}$ based on the downlink reception power of the reference signal reported from the mobile terminal coupled to the base station. By using $\alpha_{pq}$, the base station approximately calculates J ($\phi_p$) based on the reception power in the mobile terminal of the downlink reference signal. Regarding the reception power of the downlink reference signal in the mobile terminal, the base station receives a report from the mobile terminal at a handover of the mobile terminal or at a timing decided by the base station. With reference to FIG. 8, $\alpha_{pq}$ will be described below. In FIG. 8 (a), the vertical axis indicates the reception power of the mobile terminal, which is positioned between the base station #p and the base station #p', when receiving the reference signal of a prescribed system from both the base station #p and the base station #p' is received. The reception power $S_p$ (q) in the mobile terminal #q of the signal from the base station #p is decreased as the mobile terminal #q is moving away from the base station #p, and the reception power $S_{p'}$(q) in the mobile terminal #q of the signal from the base station #p' is decreased as the mobile terminal #q is moving away from the base station #p'. Based on the value of the reception power of the downlink reference signal received from the mobile terminal, as illustrated in FIG. 8 (b), the base station #p calculates $\alpha_{pq}$ as an index indicating how close the mobile terminal #q positioned between the base station #p and the base station #p' is to the base station #p. The indexes p and q of $\alpha_{pq}$ indicate the values corresponding to the mobile terminal #q coupled with the base station #p. At this time, $\alpha_{pq}$ is indicated as the formula (9) described below.

$$\alpha_{pq} = \frac{1}{2}\left\{1 + g\left(\frac{S_p(q) - \sum_{p' \in Nb(q)} S_{p'}(q)}{\Delta S_0}\right)\right\} \quad (9)$$

Regarding the formula (9), p'∈Nb (q) indicates a group of adjacent stations viewed from the mobile terminal #q, that is, a group of all the adjacent stations #p' that are adjacent to the coupling station #p' of the mobile terminal, and the term of Σ indicates the reception power of the reference signal from all the adjacent stations, that is, addition of the interference power. The mobile terminal #q reports the value of the reception power of the reference signal from the adjacent station to the base station #p. In FIG. 8, for example, there is one adjacent station #p', and $\alpha_{pq}$ is set to have the values 0 to 1 in the area where $|S_p(q)-S_{p'}(q)|$ is equal to or lower than a power difference $\Delta S_0$. It is considered that the area in which $|S_p(q)-S_{p'}(q)|$ is equal to or higher than the prescribed power difference $\Delta S_0$ does not consider the interference with respect to the base stations that are adjacent to each other, and the fixed value 0 or the fixed value 1 is set in the area (see FIG. 8 (b)).

$$g(x) = \begin{cases} 1 & x > 1 \\ x & -1 < x < 1 \\ -1 & x < -1 \end{cases} \quad (10)$$

By using the above-described αpq, J (φp) may be indicated as the formula (11). As illustrated in the formula (11), according to the second embodiment, to calculate J ($\phi_p$), the base station #p estimates the power received by the mobile terminal #q' from the adjacent station #p' by multiplying the coefficient, determined by $\alpha_{pq}$ in the denominator, by S ($\phi_p$, $\theta_q$). In the formula (11), S ($\phi_p$, $\theta_q$) is an example of the first reception power, and the value of Σ in the denominator is an example of the second reception power.

$$J(\phi_p) = \frac{\sum_{q \in serv} \alpha_{pq} S(\phi_p, \theta_q)}{N + \sum_{q \in serv} (1 - \alpha_{pq}) S(\phi_p, \theta_q)} \quad (11)$$

According to the antenna setting method of the second embodiment, the SINR of the reception quality inside the service area of the base station may be calculated simply based on the reception power of the downlink reference signal in the mobile terminal coupled with the base station. At this time, by using the above-described $\alpha_{pq}$, the base station according to the second embodiment approximately estimates the reception power (the interference power for the mobile terminal of the base station positioned in the similar position) of the reference signal from the adjacent station in the mobile terminal coupled with the adjacent station. Thus, the load of the calculating processing in the base station is low. The calculation example of $\alpha_{pq}$ illustrated in the formula (9) indicates a case of the function in which $\alpha_{pq}$ linearly decreases according to the distance. The above-described case is an example. To simulate the propagation attenuation of the radio wave according to the distance, an arbitrary function for decreasing $\alpha_{pq}$ according to the distance may be used to calculate $\alpha_{pq}$.

(3) Third Embodiment

Figure 9:
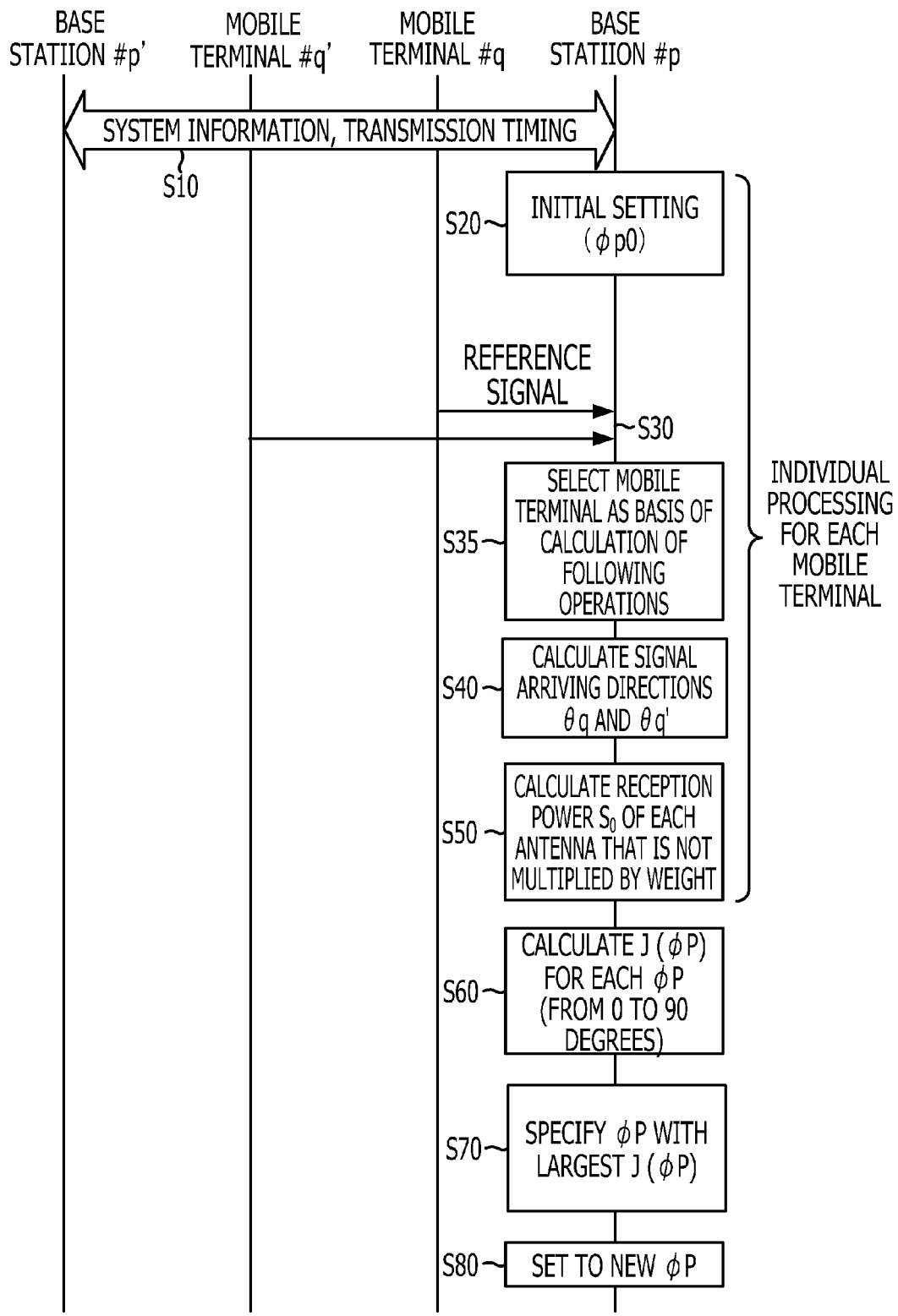
FIG. 9 is a flowchart illustrating an antenna weight setting method that is performed by the base station in a mobile communication system according to a third embodiment.

An antenna weight setting method according to a third embodiment will be described below. According to the antenna weight setting method according to the first and second embodiments, regarding the SINR calculation inside the area of the base station by the base station, there is no description of the limitation of the mobile terminal as the basis of the calculation of the mobile terminal coupled to the base station or the adjacent station. However, the limitation of the mobile terminal as the basis of the calculation may be desirable in terms of decrease of the load of the SINR calculating processing inside the area or in terms of increase of the accuracy of the SINR to be calculated. According to the second embodiment, regarding the SINR calculation inside the area by the base station, a formation of the limitation of the mobile terminal as the basis of the calculation in the mobile terminal coupled to the base station or the adjacent station will be described below. FIG. 9 is a flowchart illustrating the antenna weight setting method according to the third embodiment. The flowchart illustrated in FIG. 9 is different from the flowchart illustrated in FIG. 3 in that Operation S35 is added. In Operation S35, the base station #p selects the mobile terminal as the basis of the processing after Operation S40. To select the mobile terminal #q' coupled with the adjacent station #p', the adjacent station #p' does not transmit the information (information for decoding the transmission timing and the reference signal) about the mobile terminal #q' of the base station in Operation S10, so that the mobile terminal #q' as the basis of the SINR calculation is substantially limited. Limitation examples of the mobile terminal as the basis of SINR calculation will be described below.

(3-1) Limitation Example 1 of Mobile Terminal as Basis of SINR Calculation

From among the mobile terminals coupled to the base station that adjusts the directivity of the antenna, the mobile terminal positioned relatively close to the base station is considered not affected by the change of the directivity of a main beam. That is, in the above-described mobile terminal, it is considered that the reception quality is not deteriorated regardless of the antenna weight setting. Accordingly, from among the base stations adjusting the directivity of the antenna, the mobile terminal positioned in the distance that is farther than a prescribed first threshold from the base station may be a basis of SINR calculation inside the area. As a result, since the number of the mobile terminals as the basis of SINR calculation inside the area is decreased, the load of the SINR calculating processing inside the area is reduced. If the mobile terminal may obtain measurement information, the mobile terminal may calculate a distance between the mobile terminal and the base station if the base station obtains the control signal that includes the measurement information. If the mobile terminal may not obtain the measurement information, the mobile terminal may be determined to be close to the base station when the signal arriving angle $\theta_q$, which is calculated based on the reference signal from the mobile terminal, is relatively large. Alternatively, the reception power of the reference signal from the mobile terminal received by the base station may be an evaluation standard. If the reception power of the reference signal is large, the mobile terminal that transmits the reference signal is determined to be close to the base station.

(3-2) Limitation Example 2 of Mobile Terminal as Basis of SINR Calculation

Figure 10:
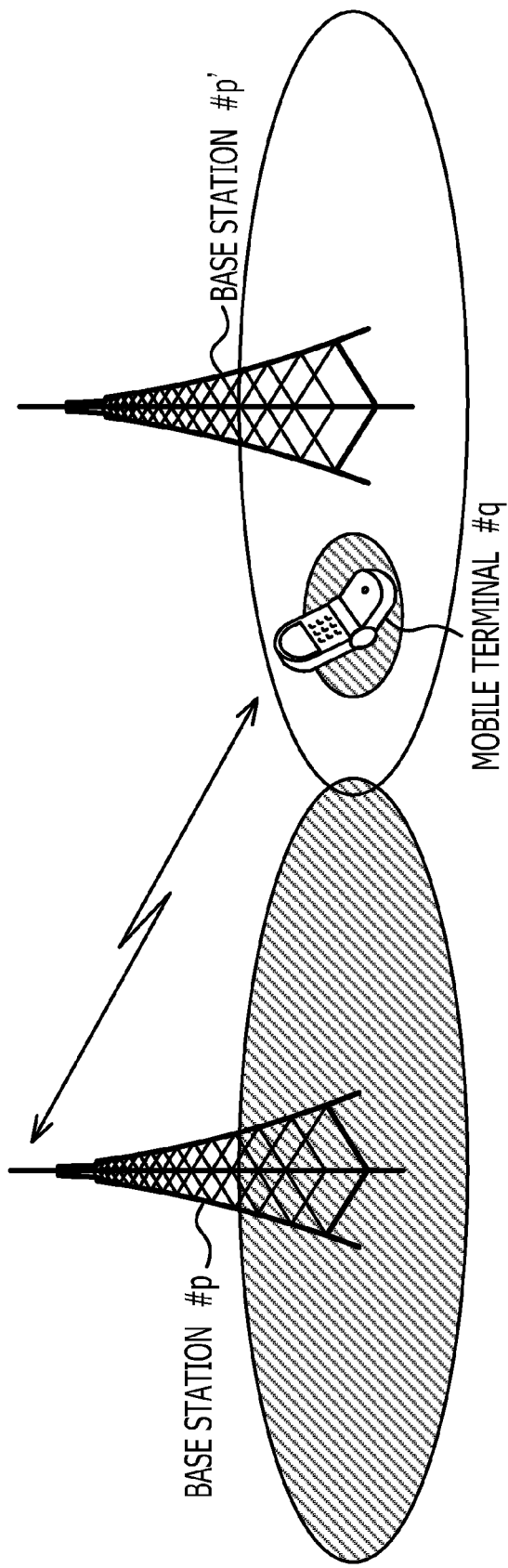
FIG. 10 is a diagram illustrating a status in which a mobile terminal as a basis of SINR calculation in an area is limited.

As illustrated in FIG. 10, depending on the radio environment such as a building location, a part of the area of the base station #p that adjusts the directivity of the antenna may enter the closed area of the area of the adjacent station #p'. The improvement of the reception quality from the mobile terminal #q positioned inside the part of the area may cause an increase of interference with respect to the adjacent station #p'. The mobile terminal #q positioned inside the part of the area is preferably not to be the basis of SINR calculation inside the area of the base station #p. In other words, the base station that adjusts the directivity of the antenna may have simply the mobile terminal, which is positioned in a distance that is shorter than a prescribed second threshold value (the second threshold value is larger than the first threshold value) from the base station, as the basis of SINR calculation inside the area. If the mobile terminal may obtain the measurement information, the mobile terminal may calculate a distance from the base station if the base station obtains the control signal that includes the measurement information. If the mobile terminal may not obtain the measurement information, the mobile terminal may be determined to be positioned far away from the base station if the signal arrive angle $\theta_q$, which is calculated based on the reference signal from the mobile terminal, is relatively small.

(3-3) Limitation Example 3 of Mobile Terminal as Basis of SINR Calculation

Figure 11:
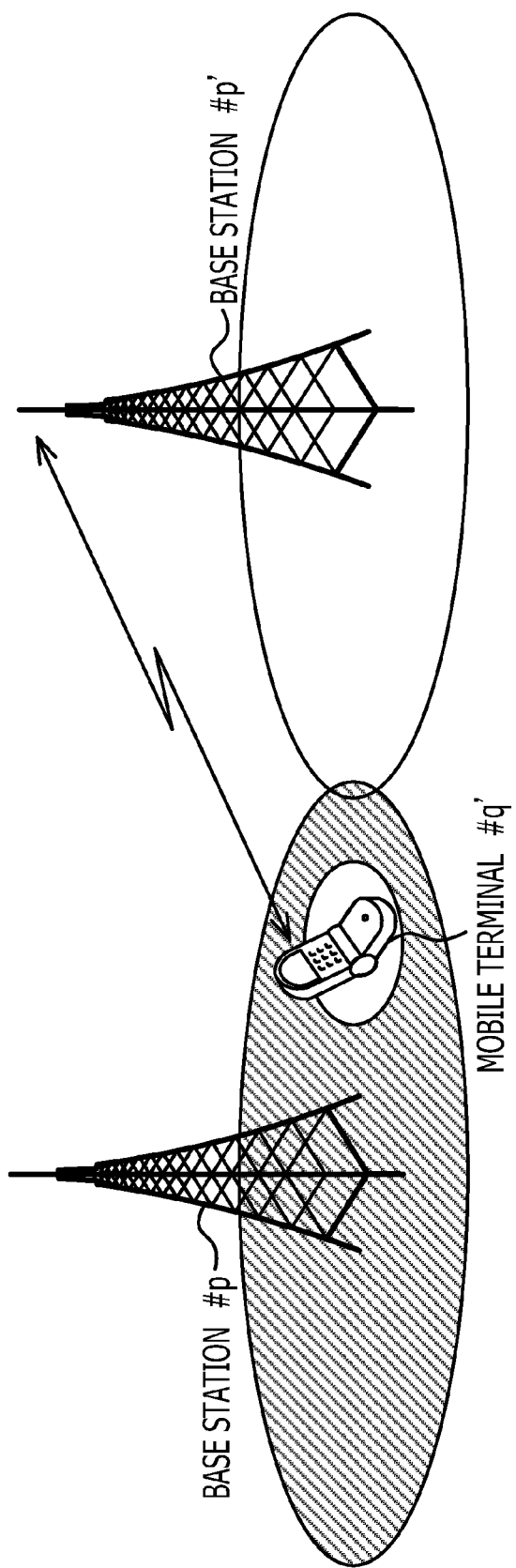
FIG. 11 is a diagram illustrating another status in which the mobile terminal as the basis of SINR calculation in the area is limited.

As illustrated in FIG. 11, contrary to FIG. 10, a part of the area of the adjacent station #p' of the base station #p that adjusts the directivity of the antenna may enter the closed area of the area of the base station #p. If the mobile terminal #q' positioned in the part of the area is the basis of SINR calculation inside the area of the base station #p, the tilt angle is set so that the interference by the mobile terminal #q' inside the part of the area is avoided. As a result, the optimum tilt angle may not be obtained. It is preferable that the mobile terminal #q' positioned inside the part of the area is not the basis of SINR calculation inside the area of the base station #p. In other words, if the distance from the adjacent station #p' of the mobile terminal #q' coupled with the adjacent station #p' is larger than a prescribed third threshold value, the mobile terminal #q' may be excluded from the basis of SINR calculation inside the area of the base station #p. Since the base station #p may not receive the control signal from the mobile terminal #q', the base station #p obtains the information about the distance between the adjacent station #p' and the mobile terminal #q' from the adjacent station #p'. In this case, from among the mobile terminals coupled to the adjacent station #p', the adjacent station #p' may obtain the control signal that includes the measurement information from the mobile terminal that may obtain the measurement information, so that the adjacent station #p' may calculate the distance from the adjacent station #p'. If the mobile terminal may not obtain the measurement information, the mobile terminal may calculate the signal arriving angle $\theta_q$, based on the reference signal from the mobile terminal.

(3-4) Limitation Example 4 of Mobile Terminal as Basis of SINR Calculation

From the viewpoint of the mobile terminal #q coupled with the base station #p that adjusts the directivity of the antenna, the mobile terminal #q' of the adjacent station #p' positioned near the cell edge of the base station #p is typically the interference signal. From the viewpoint of reducing the load of the SINR calculating processing inside the area of the base station #p, regarding the SINR calculation inside the area of the base station #p, all the mobile terminals #q' of the adjacent station #p' are not targeted, and simply the mobile terminal #q' positioned near the cell edge of the base station #p may be targeted. Since the reception power of the reference signal in the adjacent station #p' from the mobile terminal #q' positioned near the cell edge is small, the adjacent station #p' transmits the information (the transmission timing and the information for decoding the reference signal) about the mobile terminal #q' if the reception power from the mobile terminal #q' is smaller than a prescribed fourth threshold value. As a result, the load of the SINR calculating processing may be reduced without greatly reducing the accuracy of the calculated SINR.

(4) Fourth Embodiment

A fourth embodiment will be described below.

(4-1) Mobile Communication System

Figure 12:
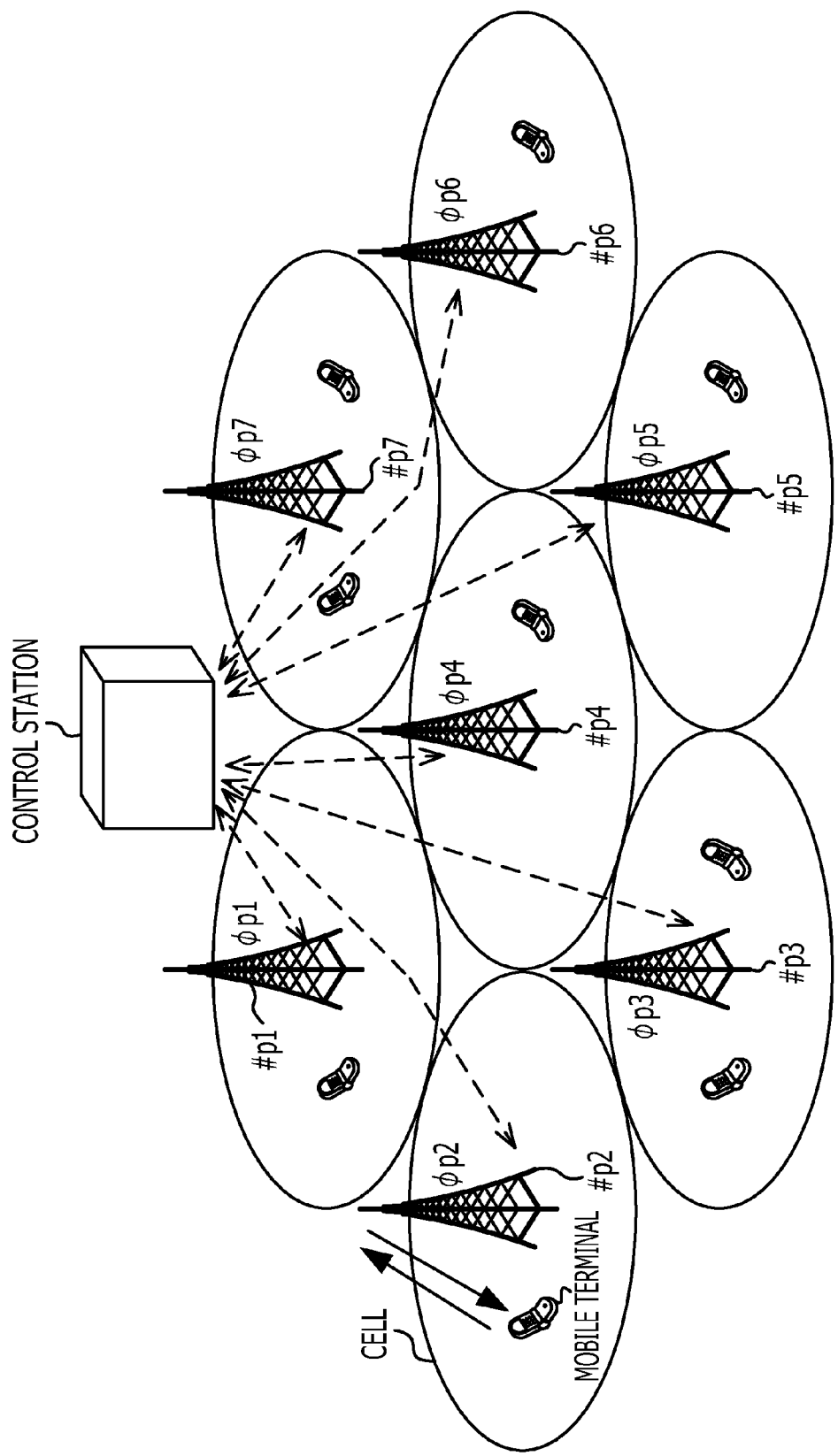
FIG. 12 is a diagram illustrating an overview of a mobile communication system according to a fourth embodiment.

In the fourth embodiment, a mobile communication system having a control station that manages a plurality of base stations inside a prescribed management area will be described below. FIG. 12 illustrates a configuration example of the mobile communication system according to the fourth embodiment. In FIG. 12, base stations #p1 to #p7 that form each cell (in this case, seven base stations, for example) are positioned inside the prescribed management area managed by the control station. Each of the base stations is coupled to be communicable with the control station by radio or wire. In this case, the tilt angles of the base stations #p1 to #p7 are referred to as tilt angles $\phi_{p1}$ to $\phi_{p7}$, respectively. In the mobile communication system according to the fourth embodiment, the control station determines tilt angles that are to be set by the base stations and reports the tilt angles to the base stations, respectively. As with the first embodiment, each of the base stations has an array antenna according to the fourth embodiment. The directivity of the antenna in the vertical plane, that is, the tilt angle is adjusted by the antenna weight that is set to each antenna. As with the second embodiment, according to the fourth embodiment, the antenna weight of broadcasting from the base stations is set based on the reception power in the mobile terminal of the downlink reference signal reported by the base stations from the mobile terminal. Each of the base stations inside the management area does not obtain a value of the reception power of a downlink reference signal from the base station in the mobile terminal coupled with another base station, for example, an adjacent station. According to the fourth embodiment, the coupling station receives a report of data for calculating the SINR inside the area of the base station according to the tilt angle and sets the tilt angle of each base station, that is, the antenna weight so that the average SINR (the average reception SINR for each mobile terminal according to the fourth embodiment) inside the management area is excellent.

(4-2) Antenna Weight Setting Method

Figure 13:
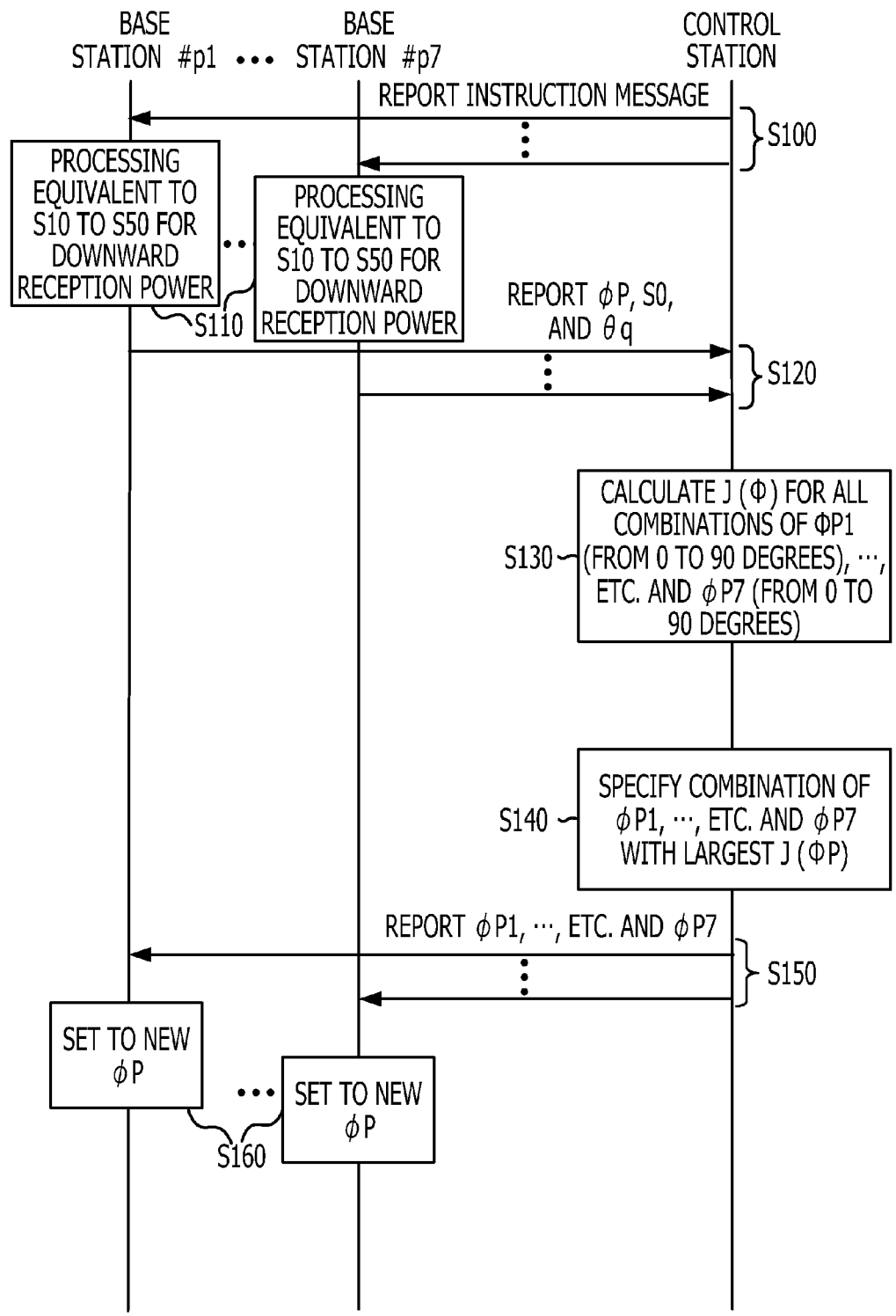
FIG. 13 is a flowchart illustrating the antenna weight setting method of each base station in the mobile communication system according to the fourth embodiment.

FIG. 13 illustrates a flowchart of an antenna weight setting method of each base station in the mobile communication system according to the fourth embodiment. In FIG. 13, when a report instruction message is transmitted to each of the base stations #p1 to #p7 from the control station (Operation S100), each of the base stations #p1 to #p7 performs the processing that is equivalent to Operations S10 to S50 illustrated in FIG. 3 on the downlink reception power (Operation S110). In this case, each of the base stations sets the initial tilt angle φp of the base station and calculates the signal arriving direction $\theta_q$ from each of the mobile terminals and the reception power $S_0$ of the reference signal in each of the mobile terminals obtained before the multiplication by the antenna weight, that is, when the antenna weight is cancelled. The base stations report the set tilt angle φp, the signal arriving direction $\theta_q$ of each of the mobile terminals, and the reception power $S_0$ of each of the mobile terminals to the coupling station (Operation S120). The mobile terminal receives the reference signal from the adjacent station as well as the stored base station and reports the reception power to the base station. Regarding the reception power $S_0$ of the reference signal in each of the mobile terminals before the multiplication by the antenna weight, the base station calculates and reports the values of the base station and the adjacent station to the coupling station, respectively. In this case, the value of the reception power $S_0$ is an example of first reception information. The coupling station includes a function (for example, the formula (2)) of the gain G of the antenna weight obtained when the tilt angle is variable or data of the gain G ($\phi_p$, $\theta_q$) of the antenna weight corresponding to an arbitrary tilt angle. Thus, by multiplying the reception power $S_0$ reported from each of the base stations by the gain G ($\phi_p$, $\theta_q$) of the antenna weight, the coupling station may estimate a reception power S ($\phi_p$, $\theta_q$) of each of the mobile terminals with respect to the reference signal in each of the mobile terminals in the management area. In the similar manner, the coupling station may estimate the reception power S ($\phi_p$, $\theta_q$) as a reception power of an arbitrary tilt angle from the adjacent station of the stored base station. The coupling station calculates an average reception SINR of each of the mobile terminals inside the management area according to the following formula (12) (Operation S130).

$$J(\Phi) = \frac{1}{|p|} \sum_p \frac{1}{N(p)} \sum_{q \in p} \frac{S(\phi_p, \theta_q)}{N + \sum_{p' \notin p} S(\phi_{p'}, \theta_q)} \quad (12)$$

In the formula (12), $\phi=\{\phi_{p1},\phi_{p2},\ldots,\phi_{p7}\}$ is a group of tilt angles, |P| indicates the number of base stations coupled with the control station, and N(p) indicates the number of mobile terminals coupled with the base station #p. In the formula (12), $$\sum_{q \in p} \frac{S(\phi_p, \theta_q)}{N + \sum_{p' \notin p} S(\phi_{p'}, \theta_q)}$$

indicates the SINR inside the area of a single base station from among the plurality of base stations. The whole formula (12) indicates the average reception SINR for each of the mobile terminals in the management area managed by the control station. In Operation S130, the control station gradually changes (for example, by one degree in the range from 0 to 90 degrees) and combines each of $\phi=\{\phi_{p1},\phi_{p2},\ldots,\phi_{p7}\}$ to specify the combination $\phi=\{\phi_{p1},\phi_{p2},\ldots,\phi_{p7}\}$ with the largest J (φ) of the formula (12). The control station reports the tilt angle specified in Operation S140 to the base stations #p1 to #p7 (Operation S150). The control station sets (updates) the antenna weight of the control station based on the tilt angle reported to the base station (Operation S160). According to the fourth embodiment, the control station unitarily controls the directivity of the antennas of the plurality of base stations, so that the reception quality of broadcasting inside the large management area managed by the control station may be excellent. Since each of the base stations inside the management area does not obtain the value of the reception power of the downlink reference signal from the base station in the mobile terminal coupled with another base station, for example, the adjacent station, it may not be preferable that a specific base station independently adjusts the tilt angle in the whole management area. However, according to the fourth embodiment, since the data based on the downlink reception power in the mobile terminal inside the management area is gathered in the coupling station, the reception quality may be optimized in the whole management area. Any of the plurality of base stations may substantively perform the above-described function of the control station. In this case, a master base station that performs the function of the control station specifies and reports the tilt angles of the plurality of base stations after receiving the report of Operation S120 from other slave base stations. In Operation S102 illustrated in FIG. 13, each of the base stations reports the reception power $S_0$ of the reference signal in each of the mobile terminals when the antenna weight is cancelled. The base station may report the downlink reception power reported from each of the mobile terminals directly to the coupling station. Since the coupling station includes the information of the tilt angle of each of the base stations, the coupling station may calculate the reception power $S_0$ of the reference signal in each of the mobile terminals when the antenna weight is cancelled.

(4-3) Configuration of Control Station and Base Station

Figure 14:
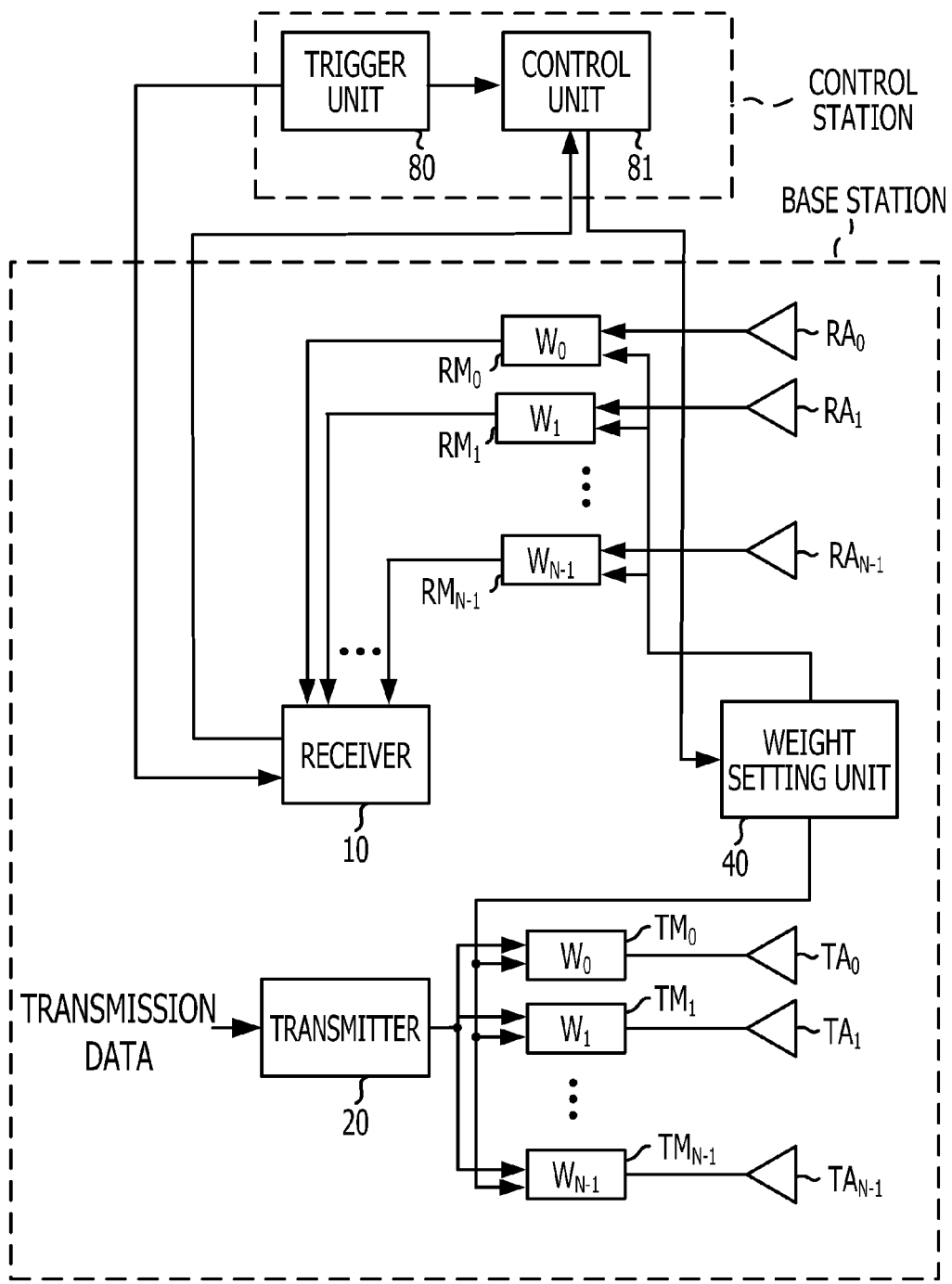
FIG. 14 is a block diagram illustrating a main unit of a configuration of a control station or a base station according to the fourth embodiment.
Figure 15:
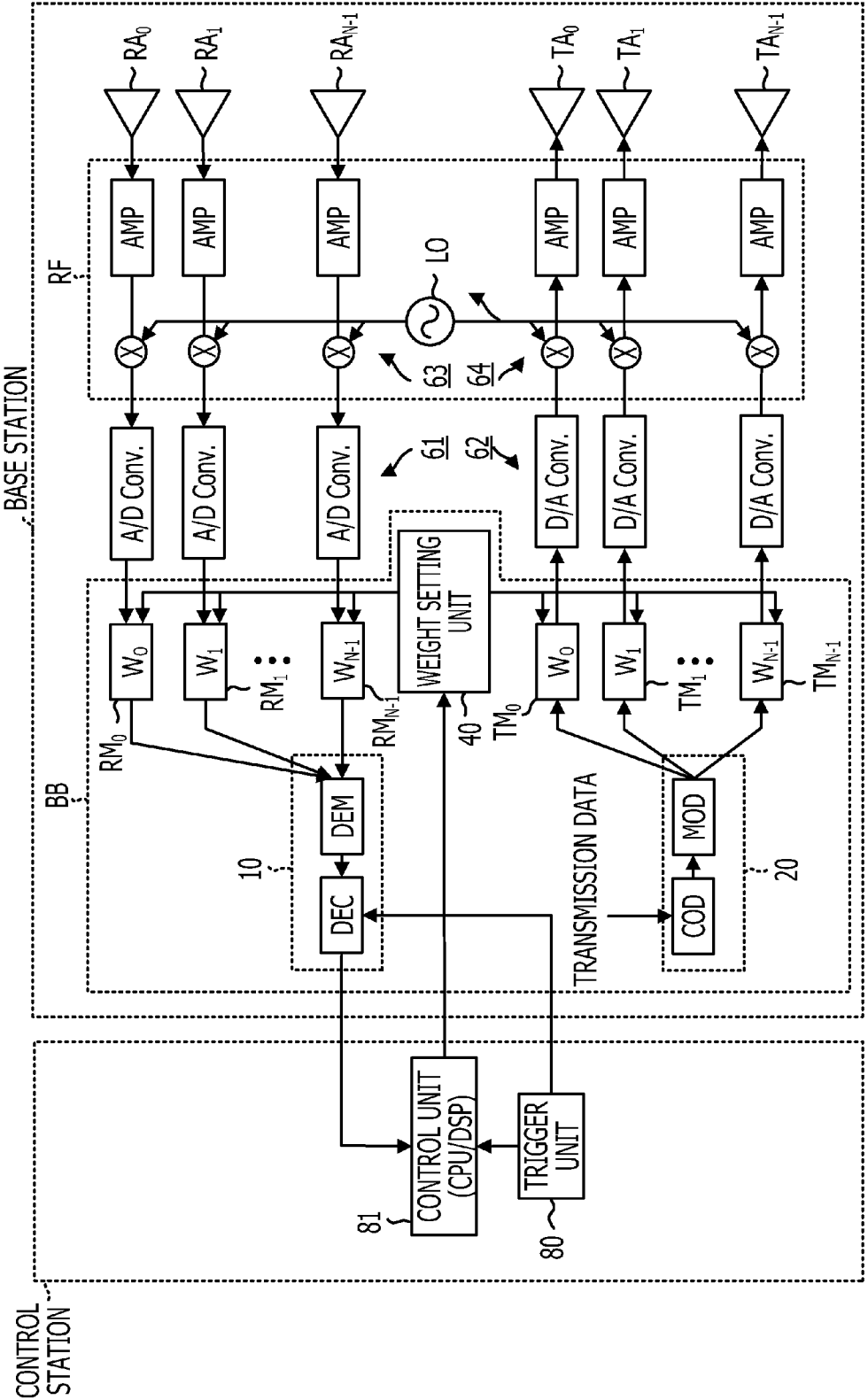
FIG. 15 is a block diagram illustrating details of the configuration of the control station and the base station according to the fourth embodiment.

FIG. 14 illustrates a configuration of a control station and a base station that achieve the antenna weight setting method according to the fourth embodiment. The configuration illustrated in FIG. 14 is different from the configuration illustrated in FIG. 4 in that the control unit 30 and the trigger unit 50 of the base station illustrated in FIG. 4 are provided in the control station. In this configuration, the timing signal in the trigger unit 80 of the control station is reported to the control unit 81 of the control station and the receiver 10 of each base station. At this timing, updating processing of the tilt angle starts. As illustrated as Operation S120 in FIG. 13, the information is given to the control unit 81 of the control station from the base stations, and the control unit 81 reports the determined tilt angle to the weight setting unit 40 of the base stations. FIG. 15 illustrates a block diagram illustrating details of the configurations of the control station and the base station. The block diagram illustrated in FIG. 15 is basically equivalent to FIG. 14 and includes more details of hardware elements. With reference to FIG. 15, the configurations of the control station and the base station will be further described. With reference to FIG. 15, a reception system will be described. After being amplified by the AMP inside the RF, the radio signals received by the reception antennas are mixed with the high frequency signals of the LO by the mixers of the mixer group 63. The received radio signals are down-converted into baseband signals. After being converted into digital signals by the A/D converters of the A/D converter group 61, the baseband signals are input into the complex multipliers $RM_0$ to $RM_{N-1}$ of the baseband processing unit (BB). As described above, the reception signals output from the plurality of complex multipliers $RM_0$ to $RM_{N-1}$ for reception are combined (added) and are then subjected to the P/S conversion. The receiver 10 includes a demodulator (DEM) and a decoder (DEC) and performs demodulating processing and decoding processing on the data signal, the control signal, and the reference signal included in the received signal, respectively. After that, the information is reported to the control unit 81 of the control station from the base station. The control unit 81 may include a CPU and/or a DSP. A transmission system illustrated in FIG. 15 will be described. The transmitter 20 includes a coder (COD) and a modulator (MOD) and performs the coding processing and the modulating processing on the control signal and the reference signal as well as the transmission data and multiplexes the signals. The transmitter 20 performs the S/P conversion on the multiplexed signal and transmits the separated signals to the plurality of complex multipliers $TM_0$ to $TM_{N-1}$. The output signals of the plurality of complex multipliers $TM_0$ to $TM_{N-1}$ are converted into analog signals by the D/A converters of the D/A converter group 62 and are then transmitted to the RF. The analog signals of the D/A convertors are combined with high frequency signals of the LO by the mixers of the mixer group 64. Accordingly, the baseband signals are up-converted into radio signals. After being amplified by the AMP, the radio signals are emitted into the space of each of the plurality of transmission antennas $TA_0$ to $TA_{N-1}$.

(5) Fifth Embodiment

Figure 16:
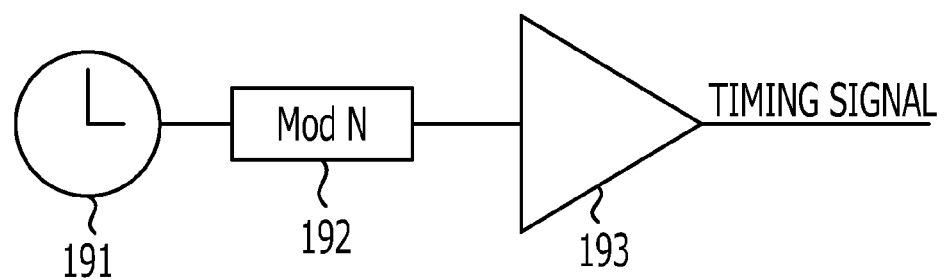
FIG. 16 is a diagram illustrating a configuration example of a trigger unit according to a fifth embodiment.

A fifth embodiment will be described below. According to the fifth embodiment, preferable update timing of the directivity of the antenna of the base station will be described. FIG. 16 is a diagram illustrating a configuration example of a trigger unit. The trigger unit illustrated in FIG. 16 includes a timer 191, a modulo calculator 192, and a signal generator 193. The timer 191 measures a time after the power of the base station is supplied. For example, a value, which indicates the time after the power is supplied by second unit, is given to the modulo calculator 192. For example, if the transmission interval of the timing signal is N (second) (N is an integer number), the modulo calculator 192 has a remainder as N is a division and gives the remainder to a signal generator 193. The signal generator 193 outputs the timing signal when the input is 0, for example, as a prescribed value. The control unit synchronizes the timing signal and starts the processing after Operation S40 as illustrated in FIG. 3, for example. According to the configuration of the trigger unit illustrated in FIG. 16, the update of the directivity of the antenna of the base station is performed regularly. The update may also be performed irregularly. For example, the transmission interval of the timing signal by the trigger unit and/or the upper limit value of the change amount ($|\Delta\phi_p|$ and/or $|\Delta\psi_p|$) of the directivity of the antenna is changed according to the previous change amount of SINR inside the area. Specifically, if the change amount of SINR inside the area is larger than a prescribed value, the transmission interval of the timing signal by the trigger unit is shortened, and the processing of the directivity of the antenna is performed more frequently. so that a preferable directivity value (angle) is obtained at an early stage. If the previous change amount of SINR inside the area is larger than the prescribed value, a larger upper limit is acceptable with respect to the change amount of SINR that is acceptable at the next directivity adjustment, so that a preferable directivity value (angle) is obtained at an early stage. The processing is performed as described below. That is, if the change amount of SINR inside the area is $\Delta T$, the base station calculates a transmission interval N according to $N=\text{Int}(\alpha-\beta\Delta T)$. The base station calculates the absolute value $|\Delta\phi_p|$ or $|\Delta\psi_p|$ of the change amount of the directivity according to $\gamma\Delta T$. Here, $\alpha$, $\beta$, and $\gamma$ are arbitrary constant numbers, and Int( ) is a function for rounding the numbers off to the closest whole number. The transmission interval of the above-described timing signal and/or the change amount of the directivity of the antenna may be changed. For example, if a base station in the mobile communication system has a failure, the mobile terminal inside the cell of the base station is covered by another base station that is adjacent to the base station with the failure. In this case, it is preferable that the cell of the base station that is adjacent to the base station with the failure is extended at an early stage. Accordingly, the base station, which is informed of a failure by the adjacent base station through, for example, the X2 interface or the like, may shorten the transmission interval of the above-described timing signals and/or may increase the change amount for accepting the directivity of the antenna.

In the embodiments, a control unit, a weight setting unit, a trigger unit and a control unit may be configured by a processor such as DSP (Digital Signal Processor) or CPU (Central Processing Unit).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio base station which includes an antenna and adjusts directivity of a radio wave to be transmitted and received by an antenna weight provided in the antenna, the radio base station comprising:

a receiver which receives a first reference signal from a first mobile terminal and a second reference signal from a second mobile terminal; and a processer which produces antenna weight which is based on the first and the second reference signals, to the antenna for sending a common data to the first and the second mobile terminals, wherein the processor calculates a standard power, as a reception power of each antenna obtained when a first antenna weight is cancelled, of the reference signal received from a mobile terminal, calculates an index value of a reception quality inside of an area of the radio base station by dividing a sum of the values obtained by multiplying each of the plurality of antenna weights which is obtained by the radio base station by each of the standard powers of the first mobile terminal by the sum of the values obtained by multiplying each of the plurality of antenna weights by each of the standard powers of the second mobile terminal, and specifies the antenna weight from among the plurality of antenna weights.

2. The radio base station according to claim 1, wherein the processor receives the reference signal, from a terminal from among the first mobile terminals of which the distance from the radio base station is larger than a prescribed first threshold value and is smaller than a second threshold value, the second threshold value being larger than the first threshold value.

3. A radio base station which includes an antenna and adjusts directivity of a radio wave to be transmitted and received by an antenna weight provided in the antenna, the radio base station comprising:
a receiver which receives a first reference signal from a first mobile terminal and a second reference signal from a second mobile terminal; and
a processor which produces antenna weight which is based on the first and the second reference signals, to the antenna for sending a common data to the first and the second mobile terminals, wherein the processor excludes, from the basis of calculation of an index value of a reception quality inside of an area of the radio base station, the reference signal from the terminal from among the second mobile terminals which is positioned of which the distance from the second radio base station is larger than a third threshold value.

4. A radio base station which includes an antenna and adjusts directivity of a radio wave to be transmitted and received by an antenna weight provided in the antenna, the radio base station comprising:
a receiver which receives a first reference signal from a first mobile terminal and a second reference signal from a second mobile terminal; and
a processor which produces antenna weight which is based on the first and the second reference signals, to the antenna for sending a common data to the first and the second mobile terminals, wherein the processor obtains a piece of information of the terminal, from among the second mobile terminals, of which a reception power of a uplink reference signal in the second radio base station is smaller than a fourth threshold value, and have the obtained second mobile terminal as the basis of the calculation of the index value.

5. A radio base station which includes an antenna and adjusts directivity in a vertical plane and/or a horizontal plane of a radio wave transmitted and received by an antenna weight provided in the antenna, the radio base station comprising:
a receiver which receives a plurality of reports of a first reception power as a reception power in a mobile terminal of a downlink reference signal from mobile terminals coupled with the radio base station;
a processor which estimates a second reception power as the reception power of the reference signal received by the mobile terminal coupled with a second radio base station from the second radio base station which is adjacent to the radio base station by multiplying the first reception power by a coefficient according to a distance from the radio base station to each of the mobile terminals, and which produces the antenna weight which is based on the first reception power and the second reception power in each of the mobile terminals, to the antenna for sending common data to the mobile terminals.

6. An antenna weight setting method used by a radio base station to set a common antenna weight for a uplink and a downlink in a mobile communication system in which the radio base station includes an antenna and adjusts a directivity of a radio wave to be transmitted and received and a mobile terminal performs a radio communication with the radio base station, wherein
a first radio base station sets a first antenna weight to transmit the common data to a mobile terminal coupled with the first radio base station,
wherein the first mobile terminal coupled with the first radio base station and a second mobile terminal coupled with a second radio base station which is adjacent to the first radio base station transmit a reference signal to the first radio base station,
wherein the first mobile terminal calculates, with respect to each of a plurality of antenna weights to be used by the first radio base station, an index value of a reception quality inside an area of the first radio base station based on the reference signal received from the first mobile terminal and the reference signal received from the mobile terminal, and
wherein the first radio base station sets a second antenna weight, instead of the first antenna weight, according to the index value from among the plurality of antenna weights to the antenna weight used to transmit the common data to the mobile terminal coupled with the first radio base station.

7. The antenna weight setting method according to claim 6, wherein calculation for the index value performed by the first radio base station includes calculating the index value by calculating, for each of the mobile terminals, the standard power as the reception power of each of the antennas obtained when the first antenna weight is cancelled, and by dividing the sum of the values, obtained by multiplying each of the plurality of antenna weights by each of the standard powers of the first mobile terminal, by the sum of the values obtained by multiplying each of the plurality of antenna weights by each of the standard powers of the second mobile terminal.

8. The antenna weight setting method according to claim 6, wherein the reference signal from the mobile terminal, from among the first mobile terminals, of which the distance from the radio base station is larger than the prescribed first threshold value and is smaller than the second threshold value which is larger than the first threshold value is included as the basis of the calculation of the index value.

9. The antenna weight setting method according to claim 6, wherein the reference signal from the mobile terminal, from among the second terminals, of which the distance from the second radio base station is larger than a prescribed third threshold value is excluded from the basis of the calculation of the index value.

10. The antenna weight setting method according to claim 6, wherein a piece of information of the mobile terminal, from among the second mobile terminals, of which the reception power of the uplink reference signal in the second radio base station is smaller than a prescribed fourth threshold value, and
wherein the obtained second mobile terminal is the basis of the calculation of the index value.

11. An antenna weight setting method used by the radio base station to set a common antenna weight for a uplink and a downlink in a mobile communication system in which the radio base station includes an antenna and adjusts a directivity in a vertical plane and/or a horizontal plane of a radio wave to be transmitted and received and a mobile terminal performs a radio communication with each of the radio base stations,
wherein each of the radio base stations sets the antenna weight to transmit a piece of common data to the mobile terminal coupled with the radio base station,
wherein each of the radio base stations receives a report of a piece of first reception information which includes a reception power in the mobile terminal of a downlink reference signal of the radio base station and another adjacent radio base station, each of the radio base stations calculates a standard power as the reception power obtained when the antenna weight of the radio base station and the other base station is cancelled and reports the standard power, and wherein, based on the standard power for each of the mobile terminals which receives the report from each of the radio base stations, the control station specifies a combination of the antenna weights of each of the radio base stations according to the index value of an average reception quality of the mobile terminal inside the area of the plurality of radio base stations and reports the combination as a new antenna weight used to transmit the common data to the each of the radio base stations.

* * * * *